(12) United States Patent
Mori

(10) Patent No.: US 8,184,330 B2
(45) Date of Patent: May 22, 2012

(54) IMAGE PROCESSING CONTROLLER AND PRINTING APPARATUS

(75) Inventor: Shunichiro Mori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 341 days.

(21) Appl. No.: 12/619,485

(22) Filed: Nov. 16, 2009

(65) Prior Publication Data

US 2010/0123937 A1    May 20, 2010

(30) Foreign Application Priority Data

Nov. 18, 2008 (JP) ................................ 2008-294152
Jul. 13, 2009 (JP) ................................ 2009-164544

(51) Int. Cl.
*G06K 15/00* (2006.01)

(52) U.S. Cl. ....... 358/1.16; 347/130; 347/211; 347/234; 347/110; 358/1.9

(58) Field of Classification Search ................. 347/130, 347/211, 234, 237, 110; 358/3.29, 1.9, 1.16
See application file for complete search history.

(56) References Cited

U.S. PATENT DOCUMENTS

| | | | | |
|---|---|---|---|---|
| 4,156,880 A * | 5/1979 | Yamada | ........................ | 358/3.29 |
| 4,500,875 A * | 2/1985 | Schmitz | ........................ | 345/530 |
| 4,653,945 A * | 3/1987 | Sato et al. | ................... | 400/144.2 |
| 4,972,500 A * | 11/1990 | Ishii et al. | ...................... | 382/274 |
| 4,985,850 A * | 1/1991 | Okamoto | ........................ | 358/1.9 |
| 5,566,277 A * | 10/1996 | Hideshima et al. | ........... | 358/1.16 |
| 5,706,045 A * | 1/1998 | Inoue | ............................. | 347/211 |
| 5,767,888 A * | 6/1998 | Schleusener et al. | ......... | 347/130 |
| 5,812,169 A * | 9/1998 | Tai et al. | ........................ | 347/110 |
| 6,067,124 A * | 5/2000 | Shirahama et al. | ........... | 348/581 |
| 6,642,950 B2 * | 11/2003 | Otose et al. | .................... | 347/237 |
| 6,765,605 B1 * | 7/2004 | Inoue | ............................. | 347/234 |
| 6,816,334 B2 * | 11/2004 | Watanabe et al. | ........... | 360/77.03 |
| 7,123,278 B2 * | 10/2006 | Kudou | ........................... | 347/130 |
| 7,165,827 B2 * | 1/2007 | Otsuki | ........................... | 347/37 |
| 7,236,422 B2 * | 6/2007 | Kageyama et al. | ...... | 365/230.06 |
| 7,306,310 B2 * | 12/2007 | Kuno et al. | ..................... | 347/15 |
| 7,880,759 B2 * | 2/2011 | Toguchi | ........................ | 347/238 |
| 2004/0183457 A1 * | 9/2004 | Kondo et al. | .............. | 315/169.3 |

FOREIGN PATENT DOCUMENTS

JP    2006-076148    3/2006

* cited by examiner

*Primary Examiner* — David K Moore
*Assistant Examiner* — Ashish K Thomas
(74) *Attorney, Agent, or Firm* — DLA Piper LLP (US)

(57) ABSTRACT

Provided is an image processing controller for controlling a line head having a plurality of light emitting elements arranged in a non-linear shape, the image processing controller including: a plurality of memory regions which stores raster data; an acquiring section which acquires the raster data; a writing control section which sequentially distributes the acquired raster data to the plurality of memory regions so as to be stored therein; and a reading control section which reads each raster data from the plurality of memory regions and sends the read raster data to the line head so as to control a light emitting state of the light emitting elements, wherein the writing control section determines an address on the memory region storing each raster data in accordance with a resolution in the sub-scanning direction and an arrangement pattern of the light emitting elements arranged in the line head.

6 Claims, 16 Drawing Sheets

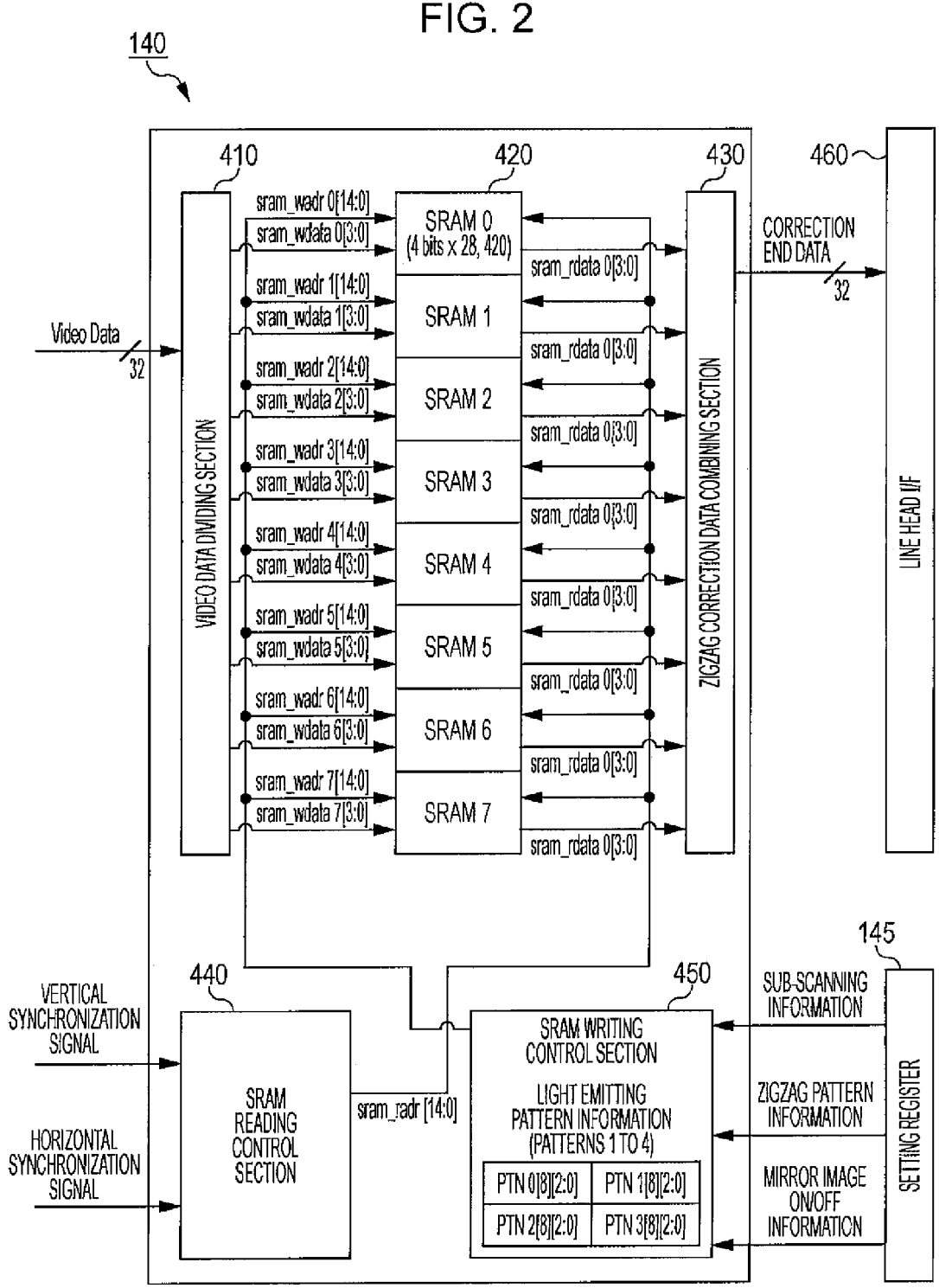

FIG. 5

| | RASTER-1 (R1') | | | | | | | |
|---|---|---|---|---|---|---|---|---|
| | RASTER-2 (R2') | dot 1-1 | | dot 1-3 | | dot 1-5 | | dot 1-7 | |
| | RASTER-3 (R3') | dot 2-1 | | dot 2-3 | | dot 2-5 | | dot 2-7 | |
| | RASTER-4 (R4') | dot 3-1 | | dot 3-3 | | dot 3-5 | | dot 3-7 | |
| | | dot 4-1 | 0 | dot 4-3 | 0 | dot 4-5 | 0 | dot 4-7 | 0 |
| | | dot 5-1 | | dot 5-3 | | dot 5-5 | | dot 5-7 | |
| | | dot 6-1 | | dot 6-3 | | dot 6-5 | | dot 6-7 | |
| | | dot 7-1 | | dot 7-3 | | dot 7-5 | | dot 7-7 | |
| | | dot 8-1 | | dot 8-3 | | dot 8-5 | | dot 8-7 | |
| | | dot 9-1 | dot 1-2 | dot 9-3 | dot 1-4 | dot 9-5 | dot 1-6 | dot 9-7 | dot 1-8 |
| | | dot 10-1 | dot 2-2 | dot 10-3 | dot 2-4 | dot 10-5 | dot 2-6 | dot 10-7 | dot 2-8 |
| | | dot 11-1 | dot 3-2 | dot 11-3 | dot 3-4 | dot 11-5 | dot 3-6 | dot 11-7 | dot 3-8 |
| 4800 DPI | | dot 12-1 | dot 4-2 | dot 12-3 | dot 4-4 | dot 12-5 | dot 4-6 | dot 12-7 | dot 4-8 |
| | | dot 13-1 | dot 5-2 | dot 13-3 | dot 5-4 | dot 13-5 | dot 5-6 | dot 13-7 | dot 5-8 |
| | | dot 14-1 | dot 6-2 | dot 14-3 | dot 6-4 | dot 14-5 | dot 6-6 | dot 14-7 | dot 6-8 |
| | | dot 15-1 | dot 7-2 | dot 15-3 | dot 7-4 | dot 15-5 | dot 7-6 | dot 15-7 | dot 7-8 |
| | | dot 16-1 | dot 8-2 | dot 16-3 | dot 8-4 | dot 16-5 | dot 8-6 | dot 16-7 | dot 8-8 |
| | | dot 17-1 | dot 9-2 | dot 17-3 | dot 9-4 | dot 17-5 | dot 9-6 | dot 17-7 | dot 9-8 |
| | | dot 18-1 | dot 10-2 | dot 18-3 | dot 10-4 | dot 18-5 | dot 10-6 | dot 18-7 | dot 10-8 |
| | | dot 19-1 | dot 11-2 | dot 19-3 | dot 11-4 | dot 19-5 | dot 11-6 | dot 19-7 | dot 11-8 |
| | | dot 20-1 | dot 12-2 | dot 20-3 | dot 12-4 | dot 20-5 | dot 12-6 | dot 20-7 | dot 12-8 |
| | | dot 21-1 | dot 13-2 | dot 21-3 | dot 13-4 | dot 21-5 | dot 13-6 | dot 21-7 | dot 13-8 |
| | | dot 22-1 | dot 14-2 | dot 22-3 | dot 14-4 | dot 22-5 | dot 14-6 | dot 22-7 | dot 14-8 |
| | | dot 23-1 | dot 15-2 | dot 23-3 | dot 15-4 | dot 23-5 | dot 15-6 | dot 23-7 | dot 15-8 |
| | | dot 24-1 | dot 16-2 | dot 24-3 | dot 16-4 | dot 24-5 | dot 16-6 | dot 24-7 | dot 16-8 |

1200 DPI

| | dot(M-15)-1 | dot(M-23)-2 | dot(M-15)-3 | dot(M-23)-4 | dot(M-15)-5 | dot(M-23)-6 | dot(M-15)-7 | dot(M-23)-8 |
|---|---|---|---|---|---|---|---|---|
| | dot(M-14)-1 | dot(M-22)-2 | dot(M-14)-3 | dot(M-22)-4 | dot(M-14)-5 | dot(M-22)-6 | dot(M-14)-7 | dot(M-22)-8 |
| | dot(M-13)-1 | dot(M-21)-2 | dot(M-13)-3 | dot(M-21)-4 | dot(M-13)-5 | dot(M-21)-6 | dot(M-13)-7 | dot(M-21)-8 |
| | dot(M-12)-1 | dot(M-20)-2 | dot(M-12)-3 | dot(M-20)-4 | dot(M-12)-5 | dot(M-20)-6 | dot(M-12)-7 | dot(M-20)-8 |
| | dot(M-11)-1 | dot(M-19)-2 | dot(M-11)-3 | dot(M-19)-4 | dot(M-11)-5 | dot(M-19)-6 | dot(M-11)-7 | dot(M-19)-8 |
| | dot(M-10)-1 | dot(M-18)-2 | dot(M-10)-3 | dot(M-18)-4 | dot(M-10)-5 | dot(M-18)-6 | dot(M-10)-7 | dot(M-18)-8 |
| | dot(M-9)-1 | dot(M-17)-2 | dot(M-9)-3 | dot(M-17)-4 | dot(M-9)-5 | dot(M-17)-6 | dot(M-9)-7 | dot(M-17)-8 |
| | dot(M-8)-1 | dot(M-16)-2 | dot(M-8)-3 | dot(M-16)-4 | dot(M-8)-5 | dot(M-16)-6 | dot(M-8)-7 | dot(M-16)-8 |
| | dot(M-7)-1 | dot(M-15)-2 | dot(M-7)-3 | dot(M-15)-4 | dot(M-7)-5 | dot(M-15)-6 | dot(M-7)-7 | dot(M-15)-8 |
| | dot(M-6)-1 | dot(M-14)-2 | dot(M-6)-3 | dot(M-14)-4 | dot(M-6)-5 | dot(M-14)-6 | dot(M-6)-7 | dot(M-14)-8 |
| | dot(M-5)-1 | dot(M-13)-2 | dot(M-5)-3 | dot(M-13)-4 | dot(M-5)-5 | dot(M-13)-6 | dot(M-5)-7 | dot(M-13)-8 |
| | dot(M-4)-1 | dot(M-12)-2 | dot(M-4)-3 | dot(M-12)-4 | dot(M-4)-5 | dot(M-12)-6 | dot(M-4)-7 | dot(M-12)-8 |
| | dot(M-3)-1 | dot(M-11)-2 | dot(M-3)-3 | dot(M-11)-4 | dot(M-3)-5 | dot(M-11)-6 | dot(M-3)-7 | dot(M-11)-8 |
| | dot(M-2)-1 | dot(M-10)-2 | dot(M-2)-3 | dot(M-10)-4 | dot(M-2)-5 | dot(M-10)-6 | dot(M-2)-7 | dot(M-10)-8 |
| | dot(M-1)-1 | dot(M-9)-2 | dot(M-1)-3 | dot(M-9)-4 | dot(M-1)-5 | dot(M-9)-6 | dot(M-1)-7 | dot(M-9)-8 |
| RM' | dot M-1 | dot(M-8)-2 | dot M-3 | dot(M-8)-4 | dot M-5 | dot(M-8)-6 | dot M-7 | dot(M-8)-8 |
| | | dot(M-7)-2 | | dot(M-7)-4 | | dot(M-7)-6 | | dot(M-7)-8 |
| | | dot(M-6)-2 | | dot(M-6)-4 | | dot(M-6)-6 | | dot(M-6)-8 |
| | | dot(M-5)-2 | | dot(M-5)-4 | | dot(M-5)-6 | | dot(M-5)-8 |
| | 0 | dot(M-4)-2 | 0 | dot(M-4)-4 | 0 | dot(M-4)-6 | 0 | dot(M-4)-8 |
| | | dot(M-3)-2 | | dot(M-3)-4 | | dot(M-3)-6 | | dot(M-3)-8 |
| | | dot(M-2)-2 | | dot(M-2)-4 | | dot(M-2)-6 | | dot(M-2)-8 |
| | | dot(M-1)-2 | | dot(M-1)-4 | | dot(M-1)-6 | | dot(M-1)-8 |
| R(M+8)' | | dot M-2 | | dot M-4 | | dot M-6 | | dot M-8 |

FIG. 9

| Raster | | | | | | | | | |
|---|---|---|---|---|---|---|---|---|---|
| RASTER-1 (R1') | | | | | | | | dot 1-8 | |
| RASTER-2 (R2') | | | | | 1200 DPI | | 0 | dot 2-8 | 2400 DPI |
| RASTER-3 (R3') | | | | | | | | dot 3-8 | |
| RASTER-4 (R4') | | | | | | 0 | | dot 4-8 | |
| ⋮ | | | | | | | dot 1-7 | dot 5-8 | |
| | | | | | | | dot 2-7 | dot 6-8 | |
| | | | | | 0 | | dot 3-7 | dot 7-8 | |
| | | | | | | | dot 4-7 | dot 8-8 | |
| | | | | 0 | | dot 1-6 | dot 5-7 | dot 9-8 | |
| | | | | | | dot 2-6 | dot 6-7 | dot 10-8 | |
| | | | 0 | | | dot 3-6 | dot 7-7 | dot 11-8 | |
| | | | | | | dot 4-6 | dot 8-7 | dot 12-8 | |
| | | 0 | | | dot 1-5 | dot 5-6 | dot 9-7 | dot 13-8 | |
| | | | | | dot 2-5 | dot 6-6 | dot 10-7 | dot 14-8 | |
| | 0 | | | | dot 3-5 | dot 7-6 | dot 11-7 | dot 15-8 | |
| | | | | | dot 4-5 | dot 8-6 | dot 12-7 | dot 16-8 | |
| | | | | dot 1-4 | dot 5-5 | dot 9-6 | dot 13-7 | dot 17-8 | |
| | | | | dot 2-4 | dot 6-5 | dot 10-6 | dot 14-7 | dot 18-8 | |
| | | | | dot 3-4 | dot 7-5 | dot 11-6 | dot 15-7 | dot 19-8 | |
| | | | | dot 4-4 | dot 8-5 | dot 12-6 | dot 16-7 | dot 20-8 | |
| | | | dot 1-3 | dot 5-4 | dot 9-5 | dot 13-6 | dot 17-7 | dot 21-8 | |
| | | | dot 2-3 | dot 6-4 | dot 10-5 | dot 14-6 | dot 18-7 | dot 22-8 | |
| | | | dot 3-3 | dot 7-4 | dot 11-5 | dot 15-6 | dot 19-7 | dot 23-8 | |
| | | | dot 4-3 | dot 8-4 | dot 12-5 | dot 16-6 | dot 20-7 | dot 24-8 | |
| | | dot 1-2 | dot 5-3 | dot 9-4 | dot 13-5 | dot 17-6 | dot 21-7 | dot 25-8 | |
| | | dot 2-2 | dot 6-3 | dot 10-4 | dot 14-5 | dot 18-6 | dot 22-7 | dot 26-8 | |
| | | dot 3-2 | dot 7-3 | dot 11-4 | dot 15-5 | dot 19-6 | dot 23-7 | dot 27-8 | |
| | | dot 4-2 | dot 8-3 | dot 12-4 | dot 16-5 | dot 20-6 | dot 24-7 | dot 28-8 | |
| RASTER-29 (R29') | dot 1-1 | dot 5-2 | dot 9-3 | dot 13-4 | dot 17-5 | dot 21-6 | dot 25-7 | dot 29-8 | |
| | dot 2-1 | dot 6-2 | dot 10-3 | dot 14-4 | dot 18-5 | dot 22-6 | dot 26-7 | dot 30-8 | |
| ⋮ | dot 3-1 | dot 7-2 | dot 11-3 | dot 15-4 | dot 19-5 | dot 23-6 | dot 27-7 | dot 31-8 | |
| | dot 4-1 | dot 8-2 | dot 12-3 | dot 16-4 | dot 20-5 | dot 24-6 | dot 28-7 | dot 32-8 | |

FIG. 10

| | | | | | | | | | |
|---|---|---|---|---|---|---|---|---|---|
| RASTER-1 (R1') | | | | | 1200 DPI | | | 0 | dot 1-8 |
| RASTER-2 (R2') | | | | | | | | | dot 2-8 | 1200 DPI
| RASTER-3 (R3') | | | | | | | 0 | dot 1-7 | dot 3-8 |
| RASTER-4 (R4') | | | | | | | | dot 2-7 | dot 4-8 |
| ⋮ | | | | | | 0 | dot 1-6 | dot 3-7 | dot 5-8 |
| | | | | | | | dot 2-6 | dot 4-7 | dot 6-8 |
| | | | | | 0 | dot 1-5 | dot 3-6 | dot 5-7 | dot 7-8 |
| | | | | | | dot 2-5 | dot 4-6 | dot 6-7 | dot 8-8 |
| | | | | 0 | dot 1-4 | dot 3-5 | dot 5-6 | dot 7-7 | dot 9-8 |
| | | | | | dot 2-4 | dot 4-5 | dot 6-6 | dot 8-7 | dot 10-8 |
| | | | | dot 1-3 | dot 3-4 | dot 5-5 | dot 7-6 | dot 9-7 | dot 11-8 |
| | | | | dot 2-3 | dot 4-4 | dot 6-5 | dot 8-6 | dot 10-7 | dot 12-8 |
| | | | dot 1-2 | dot 3-3 | dot 5-4 | dot 7-5 | dot 9-6 | dot 11-7 | dot 13-8 |
| | | | dot 2-2 | dot 4-3 | dot 6-4 | dot 8-5 | dot 10-6 | dot 12-7 | dot 14-8 |
| RASTER-15 (R15') | | | dot 1-1 | dot 3-2 | dot 5-3 | dot 7-4 | dot 9-5 | dot 11-6 | dot 13-7 | dot 15-8 |
| ⋮ | | | dot 2-1 | dot 4-2 | dot 6-3 | dot 8-4 | dot 10-5 | dot 12-6 | dot 14-7 | dot 16-8 |

IMAGE PROCESSING CONTROLLER AND PRINTING APPARATUS

BACKGROUND

1. Technical Field

The present invention relates to a technology for controlling a line head.

2. Related Art

A line head used in a printing device, a scanner device, and the like is provided with a plurality of light emitting elements. Among various line heads, there is known a line head having a structure in which the light emitting elements are arranged in a zigzag shape (staggered shape) so as to prevent the deterioration in the light intensity between the adjacent light emitting elements.

However, in the case where the light emitting elements are arranged in a zigzag shape, when all the light emitting elements emit light at the same time, the light emitting positions in the sub-scanning direction deviate from each other. For this reason, in recent years, a technology (hereinafter, referred to as "a zigzag correction") has been developed which deviates the operation times of the light emitting elements, and therefore corrects and prevents the deviation in the light emitting positions.

In addition, arranging the light emitting elements in this particular arrangement pattern of a zigzag shape is various. For this reason, in order to perform the zigzag correction on the line head having different arrangement patterns, it is necessary to prepare exclusive control hardware for each of the line heads or to prepare hardware in which a pattern control can be changed in accordance with a register setting.

For example, JP-A-2006-76148 discloses hardware in which a pattern control can be changed by a register setting.

However, in the technology disclosed in JP-A-2006-76148, since the recording (light emitting) time of each recording (light emitting) element chip is controlled just on the basis of a predetermined recording (light emitting) element chip row, it is not possible to handle different sub-scanning resolutions.

SUMMARY

An advantage of some aspects of the invention is that it provides a technology capable of performing a zigzag correction on line heads having various arrangement patterns and handling plural sub-scanning resolutions.

In order to achieve the above-described object, according to an aspect of the invention, there is provided an image processing controller for controlling a line head having a plurality of light emitting elements arranged in a non-linear shape, the image processing controller including: a plurality of memory regions which stores raster data; an acquiring section which acquires the raster data; a writing control section which sequentially distributes the acquired raster data to the plurality of memory regions so as to be stored therein; and a reading control section which reads each raster data from the plurality of memory regions and sends the read raster data to the line head so as to control a light emitting state of the light emitting elements, wherein the writing control section determines an address on the memory region storing each raster data in accordance with a resolution in the sub-scanning direction and an arrangement pattern of the light emitting elements arranged in the line head.

BRIEF DESCRIPTION OF THE DRAWINGS

The invention will be described with reference to the accompanying drawings, wherein like numbers reference like elements.

FIG. 2 is a diagram showing an example of a detailed configuration of a setting register and an image processing circuit.

FIG. 3A is a diagram showing a first arrangement pattern, FIG. 3B is a diagram showing a second arrangement pattern, FIG. 3C is a diagram showing a third arrangement pattern, and FIG. 3D is a diagram showing a fourth arrangement pattern.

FIG. 4A is a diagram showing the light emitting timing in the case where the line head having the first arrangement pattern is used, FIG. 4B is a diagram showing the light emitting timing in the case where the line head having the second arrangement pattern is used, FIG. 4C is a diagram showing the light emitting timing in the case where the line head having the third arrangement pattern is used, and FIG. 4D is a diagram showing the light emitting timing in the case where the line head having the fourth arrangement pattern is used.

FIG. 5 is a diagram showing an example of an output of video data in the case where the line head having the first arrangement pattern is used.

FIG. 9 is a diagram showing an example of an output of video data in the case where the line head having the third arrangement pattern is used and a sub-scanning resolution is 2400 DPI.

FIG. 10 is a diagram showing an example of an output of video data in the case where the line head having the third arrangement pattern is used and a sub-scanning resolution is 1200 DPI.

DESCRIPTION OF EXEMPLARY EMBODIMENTS

Hereinafter, an exemplary embodiment of the invention will be described with reference to the accompanying drawings.

Figure 1:
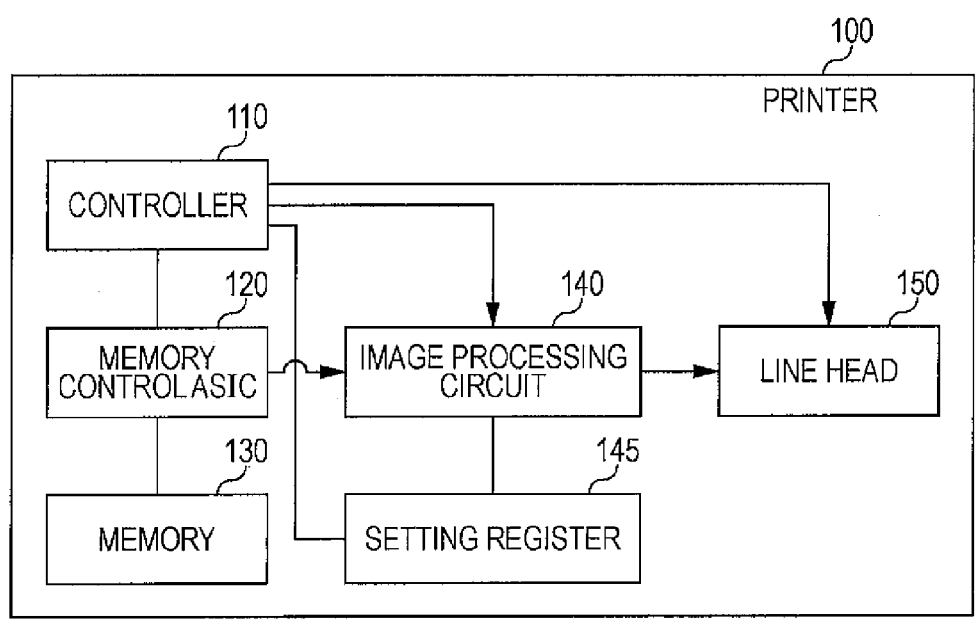
FIG. 1 is a block diagram showing an example of a configuration of hardware of a printer according to an embodiment of the invention.

FIG. 1 is a block diagram showing an example of a configuration of hardware of a printer 100 according to an embodiment of the invention. As shown in FIG. 1, the printer 100 includes a controller 110, a memory control ASIC 120, a memory 130, an image processing circuit 140, a setting register 145, and a line head 150.

However, the configuration of the printer 100 is not limited thereto. For example, the printer 100 may include a printing engine (which includes a photo conductor, a line head 150, and the like), a network interface, an input device (a button, a touch panel, or the like), a display device (a display panel), and the like. In addition, the printer 100 is not limited to a printing device, but may be, for example, a multifunctional device, a scanner device, a FAX device, or the like.

The controller 110 generally controls the printer 100. For example, the controller 110 controls a line head 150 so as to selectively allow an outer peripheral surface of a uniformly charged photo conductor to be exposed to light. In addition, the controller 110 performs a developing process by applying toner as a developing agent to an electrostatic latent image formed on the outer peripheral surface by the exposure. Further, the controller 110 includes a CPU and the like.

The memory control ASIC 120 controls the memory 130. In detail, the memory control ASIC 120 performs a reading control of the reading data (video data and the like) from the memory 130 or a writing control of writing data to the memory 130 on the basis of the command output from the controller 110.

The memory 130 includes a general storage unit such as a RAM, a ROM, or a hard disk, and stores video data of a printing target and the like. In addition, the video data stored in the memory 130 may be video data created by a host PC of the printer 100 or video data created by the printer 100. The memory 130 may be a volatile memory or a nonvolatile memory. Further, the memory 130 may be a portable memory.

The image processing circuit 140 determines the light emitting timing of each of the light emitting elements arranged in the line head 150, and supplies the video data of the printing target to the line head 150 in accordance with the determined light emitting timing. In addition, although the detailed configuration will be described later, the light emitting elements are arranged in the line head 150 so as to have a zigzag shape, and the image processing circuit 140 corrects the light emitting timing of each light emitting element in accordance with the arrangement pattern of each of the light emitting elements arranged in the line head 150, where the correction corresponds to the zigzag correction.

The setting register 145 stores a setting value related to the control of the line head 150. For example, the setting register 145 stores sub-scanning information used to determine a resolution in the sub-scanning direction of the line head 150, zigzag pattern information used to determine the arrangement pattern of the light emitting elements arranged in the line head 150, and mirror image ON/OFF information used to determine whether the electrostatic latent image formed on the photo conductor is formed as a mirror image or a normal image. In addition, the setting value of the setting register 145 may be changed by inputting a new setting value from an input device provided in the printer 100 or a printer host (PC) (not shown) to the controller 110.

FIG. 2 is a diagram showing an example of a detailed configuration of the setting register 145 and the image processing circuit 140. As shown in FIG. 2, the image processing circuit 140 includes a video data dividing section 410, an SRAM 420 which is divided into plural (eight in the example shown in FIG. 2) storage regions, a zigzag correction data combining section 430, an SRAM reading control section 440, an SRAM writing control section 450, and a line head interface (I/F) 460.

The video data dividing section 410 divides the line sequentially input video data through the memory control ASIC 120, and supplies (distributes) the resultant to the SRAM 420. In addition, the input bit width to the video data dividing section 410 is set to 32 bits.

The SRAM 420 is divided into plural storage regions, and includes, for example, eight SRAMs 0 to 7 as shown in FIG. 2. The SRAMs 0 to 7 (storage regions) have the same configuration, and has, for example, storage capacity of 4 bits× 26420. Each of the SRAMs 0 to 7 (storage regions) stores (receives) the video data supplied from the video data dividing section 410 by the unit of 4 bits, and the video data is output to the zigzag correction data combining section 430 by the unit of 4 bits.

The zigzag correction data combining section 430 combines the video data (subjected to the zigzag correction) read from the SRAM 420, and supplies the resultant to the line head I/F 460. In addition, the output bit width from the zigzag correction data combining section 430 is set to 32 bits. The line head I/F 460 has a raster buffer corresponding to at least one line, but here the raster buffer is omitted.

The SRAM writing controller section 450 performs a writing control of writing the video data (32 bits), line sequentially input to the video data dividing section 410, to the SRAM 420. The SRAM writing control section 450 determines the light emitting timing (storage sequence) of each light emitting element by referring to the setting value of the setting register 145, and writes the video data divided into 4 bits to each of the SRAMs 0 to 7 (storage region) in accordance with the determined light emitting timing (storage sequence). In detail, the SRAM writing control section 450 reads the zigzag pattern information stored in the setting register 145, specifies the arrangement pattern of the light emitting elements arranged in the line head 150, and then selects the light emitting pattern information (patterns 1 to 4) showing the light emitting timing (storage sequence) in accordance with the specified arrangement pattern. In addition, in accordance with the technology of the selected light emitting pattern information, the video data dividing section 410 writes the divided video data to each of the SRAMs 0 to 7 (storage region).

The SRAM reading control section 440 allows the video data stored in the SRAMs 0 to 7 (storage region) to be read in parallel by the unit of 4 bits by the zigzag correction data combining section 430. In detail, the SRAM reading control section 440 reads the video data (subjected to the zigzag correction) in parallel by the unit of 4 bits from each of the SRAMs 0 to 7 (storage region) in synchronization with the vertical and horizontal synchronization signals supplied from the controller 110. In addition, the SRAM reading control section 440 reads the video data from each of the SRAMs 0 to 7 (storage region) by designating the same address of each of the SRAMs 0 to 7.

The line head I/F 460 outputs the video data, supplied from the zigzag correction data combining section 430, to the line head 150.

Returning to FIG. 1, the line head 150 has plural light emitting elements (for example, LEDs) arranged in the main-scanning direction so as to have a zigzag shape.

FIGS. 3A to 3D are diagrams showing the arrangement patterns of the light emitting elements in the line head 150.

Figure 3A:
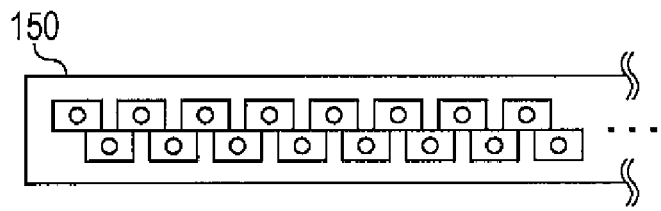
FIGS. 3A, 3B, 3C, and 3D are diagrams showing an arrangement pattern of light emitting elements in a line head, where

FIG. 3A is a diagram showing the first arrangement pattern. The first arrangement pattern has a zigzag configuration in which the light emitting elements deviate from each other every one pixel (one dot) in the sub-scanning direction. As shown in FIG. 3A, the first arrangement pattern has two rows, that is, upstream and downstream rows in the sub-scanning direction.

Figure 3B:
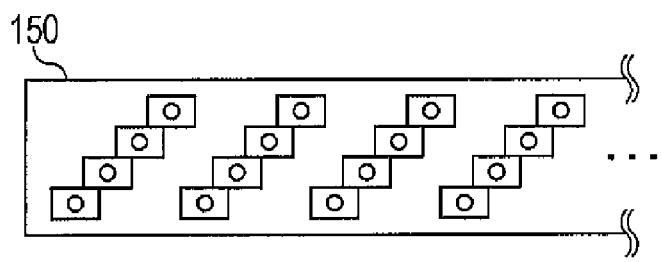

FIG. 3B is a diagram showing the second arrangement pattern. The second arrangement pattern has a zigzag configuration in which the light emitting elements deviate from each other every one pixel (one dot) in the sub-scanning direction. As shown in FIG. 3B, the arrangement pattern has four rows in the sub-scanning direction.

Figure 3C:
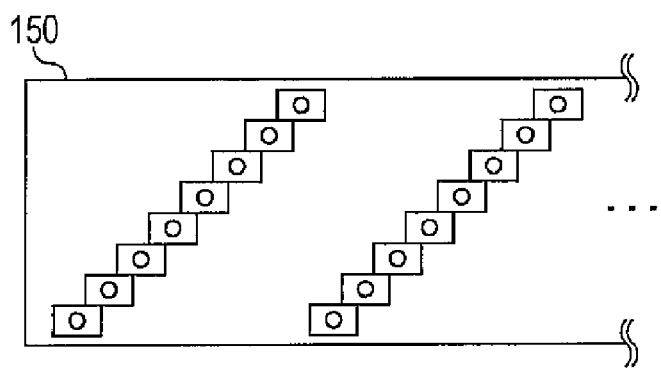

FIG. 3C is a diagram showing the third arrangement pattern. The third arrangement pattern has a zigzag configuration in which the light emitting elements deviate from each other every one pixel (one dot) in the sub-scanning direction. As shown in FIG. 3C, the arrangement pattern has eight rows in the sub-scanning direction.

Figure 3D:
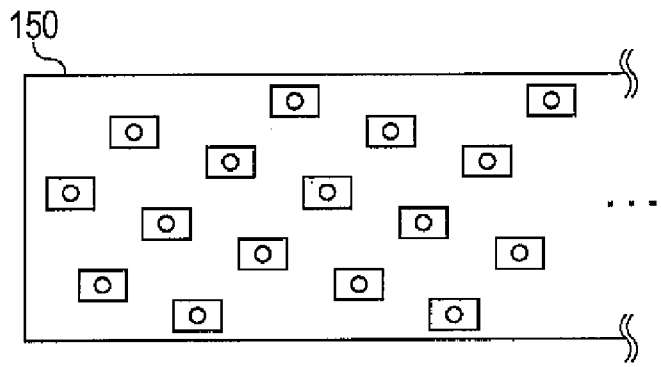

FIG. 3D is a diagram showing the fourth arrangement pattern. The fourth arrangement pattern has a zigzag configuration in which the light emitting elements deviate from each other every one pixel (one dot) in the sub-scanning direction. As shown in FIG. 3D, the arrangement pattern has eight rows in the sub-scanning direction.

In the invention, it is possible to perform the zigzag correction in any one of the arrangement patterns shown in FIGS. 3A to 3D. However, the invention is not limited to these arrangement patterns. That is, other arrangement patterns may be used if the arrangement pattern has eight or less rows in the sub-scanning direction. In addition, in the case where the arrangement pattern of the light emitting elements has nine or more rows, the number of the SRAMs 0 to 7 constituting the SRAM 420 may increase. For example, in the case where the arrangement pattern of the light emitting elements has 16 rows in the sub-scanning direction, the SRAM 420 includes sixteen SRAMs 0 to 15.

In addition, FIGS. 4A to 4D are diagrams showing the light emitting timing in the case where the line heads 150 having the first to fourth arrangement patterns are used.

Figure 4A:
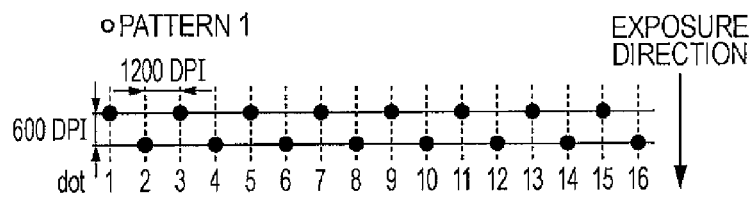
FIGS. 4A, 4B, 4C, and 4D are diagrams showing the light emitting timing of the cases in which the line heads having the first to fourth arrangement patterns are used, where

FIG. 4A is a diagram showing the light emitting timing (printing timing) in the case where the line head 150 having the first arrangement pattern is used. As shown in FIG. 4A, in the first arrangement pattern, the light emitting elements (included in the first row) located at the first position, the third position, the fifth position, and the like emit light toward the main scanning direction at the same timing, and the light emitting elements (included in the second row) located at the second position, the fourth position, the sixth position, and the like emit light toward the main scanning direction later than that of the light emitting elements included in the first row (later by the time corresponding to one raster in the sub-scanning direction). Likewise, if the light emitting times deviate from each other (by the zigzag correction), even in the case where the light emitting elements are arranged in accordance with the zigzag configuration (the first arrangement pattern) as shown in FIG. 3A, the printing is performed on a printing medium in a linear shape.

Further, in this example, a gap between the adjacent light emitting elements in the main scanning direction is set to a printing gap in the case of the resolution of 1200 DPI, and a gap between the adjacent light emitting elements in the sub-scanning direction is set to a printing gap in the case of the resolution of 600 DPI. Furthermore, the gaps between the adjacent light emitting elements in the main scanning direction and the sub-scanning direction of the second to fourth arrangement patterns are set to be the same as that of the first arrangement pattern.

Figure 4B:
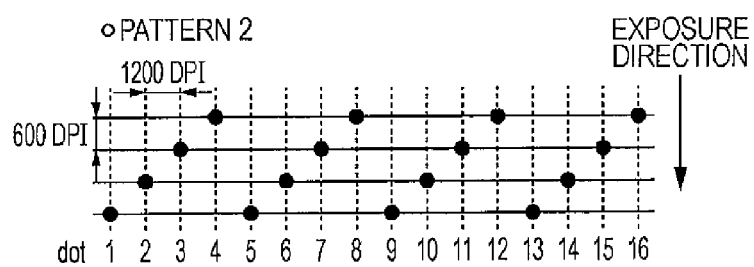

FIG. 4B is a diagram showing the light emitting timing (printing timing) in the case where the line head 150 having the second arrangement pattern is used. As shown in FIG. 4B, in the second arrangement pattern, the light emitting elements (included in the first row) located at the fourth, eighth, twelfth, sixteenth positions and so forth, emit light toward the main scanning direction at the same time. The light emitting elements (included in the second row) located at the third, seventh, eleventh, fifteenth positions and so forth, emit light toward the main scanning direction later than that of the light emitting elements included in the first row (later by the time corresponding to one raster in the sub-scanning direction). The light emitting elements (included in the third row) located at the second, sixth, tenth, fourteenth positions and so forth, emit light toward the main scanning direction later than that of the light emitting elements included in the second row (later by the time corresponding to one raster in the sub-scanning direction). Further, the light emitting elements (included in the fourth row) located at the first, fifth, ninth, thirteenth positions and so forth, emit light toward the main scanning direction later than that of the light emitting elements included in the third row (later by the time corresponding to one raster in the sub-scanning direction). Likewise, if the light emitting times deviate from each other (by the zigzag correction), even in the case where the light emitting elements are arranged in accordance with the zigzag configuration (the second arrangement pattern) as shown in FIG. 3B, the printing is performed on a printing medium in a linear shape.

Figure 4C:
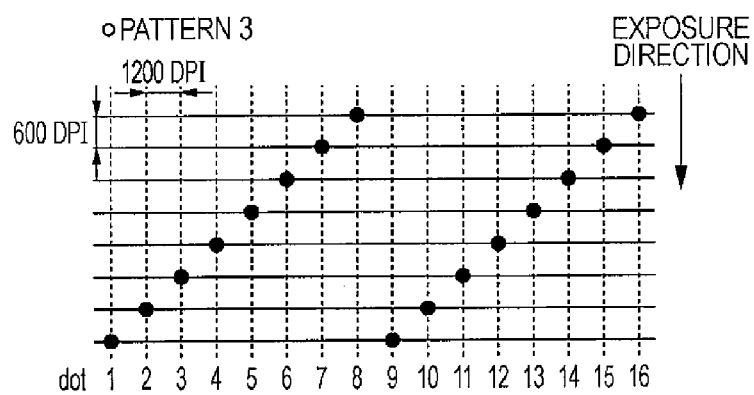

FIG. 4C is a diagram showing the light emitting timing (printing timing) in the case where the line head 150 having the third arrangement pattern is used. As shown in FIG. 4C, in the third arrangement pattern, the light emitting elements (included in the first row) located at the eighth, sixteenth positions and so forth, emit light toward the main scanning direction at the same time. The light emitting elements (included in the second row) located at the seventh, fifteenth positions and so forth, emit light toward the main scanning direction later than that of the light emitting elements included in the first row (later by the time corresponding to one raster in the sub-scanning direction). The light emitting elements (included in the third row) located at the sixth, fourteenth positions and so forth, emit light toward the main scanning direction at later than that of the light emitting elements included in the second row (later by the time corresponding to one raster in the sub-scanning direction). In the same manner, the light emitting elements included in the fourth row emit later than that of the light emitting elements included in the third row (later by the time corresponding to one raster in the sub-scanning direction), the light emitting element included in the fifth row emit later than that of the light emitting elements included in the fourth row (later by the time corresponding to one raster in the sub-scanning direction), the light emitting elements included in the sixth row emit light later than that of the light emitting elements included in the fifth row (later by the time corresponding to one raster in the sub-scanning direction), the light emitting elements included in the seventh row emit light later than that of the light emitting elements included in the sixth row (later by the time corresponding to one raster in the sub-scanning direction), and then the light emitting elements included in the eighth row emit light later than that of the light emitting elements included in the seventh row (later by the time corresponding to one raster in the sub-scanning direction). Likewise, if the light emitting times deviate from each other (by the zigzag correction), even in the case where the light emitting elements are arranged in accordance with the zigzag configuration (the third arrangement pattern) as shown in FIG. 3C, the printing is performed on a printing medium in a linear shape.

Figure 4D:
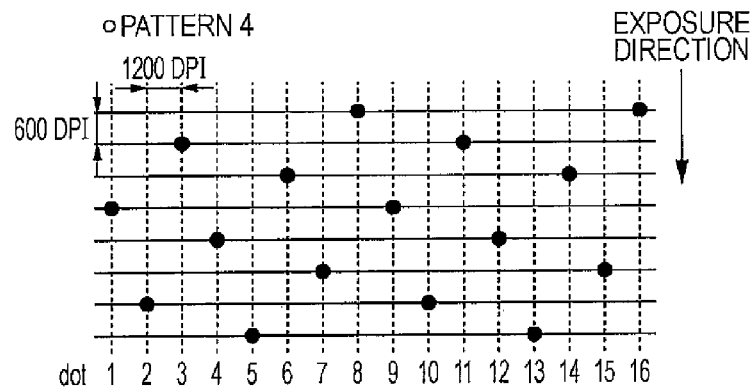

FIG. 4D is a diagram showing the light emitting timing (printing timing) in the case where the line head 150 having the fourth arrangement pattern is used. As shown in FIG. 4D, in the fourth arrangement pattern, the light emitting elements (included in the first row) located at the eighth, sixteenth positions and so forth, emit light toward the main scanning direction at the same timing. The light emitting elements (included in the second row) located at the third, eleventh positions and so forth, emit light toward the main scanning direction later than that of the light emitting elements included in the first row (later by the time corresponding to one raster in the sub-scanning direction). The light emitting elements (included in the third row) located at the sixth, fourteenth positions and so forth, emit light toward the main scanning direction later than that of the light emitting elements included in the second row (later by the time corresponding to one raster in the sub-scanning direction). In the same manner, the light emitting elements included in the fourth row emit light later than that of the light emitting elements included in the third row (later by the time corresponding to one raster in the sub-scanning direction), the light emitting elements included in the fifth row emit light later than that of the light emitting elements included in the fourth row (later by the time corresponding to one raster in the sub-scanning direction), the light emitting elements included in the sixth row emit light later than that of the light emitting elements included in the fifth row (later by the time corresponding to one raster in the sub-scanning direction), the light emitting elements included in the seventh row emit light later than that of the light emitting elements included in the sixth row (later by the time corresponding to one raster in the sub-scanning direction), and the light emitting elements included in the eighth row emit light later than that of the light emitting elements included in the seventh row (later by the time corresponding to one raster in the sub-scanning direction). Likewise, if the light emitting times deviate from each other (by the zigzag correction), even in the case where the light emitting elements are arranged in accordance with the zigzag configuration (the fourth arrangement pattern) as shown in FIG. 3D, the printing is performed on a printing medium in a linear shape.

Next, FIGS. 5 to 8 are diagrams showing examples of the output (light emitting timing) of the video data. In FIGS. 5 to 8, the video data corresponding to one page is formed by the video data corresponding to the M raster (M≧1). In addition, each raster is formed by a predetermined number of bits (for example, 15680 bits). Further, the video data of the first raster is marked as "dot1-1" to "dot1-15680", the video data of the second raster is marked as "dot2-1" to "dot2-15680", and the other rasters are marked in the same manner as described above. That is, the video data of the M-th raster is marked as "dotM-1" to "dotM-15680". However, the actual value of each video data (1 bit) is formed by the value such as "0" or "1" indicating the output state (where light is emitted) or the non-output state (where light is not emitted).

Further, the respective rows shown in the respective drawings correspond to the light emitting elements arranged in the line head 150. In the examples shown in the respective drawings, only the example of the output of the light emitting elements located at the first to eighth positions from the right side are shown among the light emitting elements arranged in the line head 150.

In addition, each video data (1 bit) at the same row corresponds to the example of the output in which the light is emitted from each of the light emitting elements located at the first to eighth positions at the same time. Further, "0" indicates the non-output state (where light is not emitted).

FIG. 5 is a diagram showing an example of the output (light emitting timing) of the video data in the case where the line head 150 having the first arrangement pattern is used.

As shown in FIG. 5, the light emitting elements (located at the first to eighth positions) perform the output (light emission) corresponding to "dot1-1", "0", "dot1-3", "0", "dot1-5", "0", "dot1-7", and "0" at the initial light emitting timing. In addition, the light emitting elements (located at the first to eighth positions) perform the output (light emission) corresponding to "dot2-1", "0", "dot2-3", "0", "dote-5", "0", "dot2-7", and "0" at the light emitting timing according to the next horizontal synchronization signal.

Likewise, the light emitting elements located at the odd number-th positions first sequentially perform the output (light emission) corresponding to the video data of the rasters such as the first raster and the second raster. On the contrary, the light emitting elements located at the even number-th positions start the output (light emission) corresponding to the video data of the rasters such as the first raster and the second raster after the light emitting elements located at the odd number-th positions perform the output (light emission) corresponding to the video data of eight rasters.

In addition, in the video data corresponding to one raster, the printing is performed to have the printing gap in the case of the resolution of 4800 DPI. Accordingly, the fact that the light emitting elements located at the even number-th positions start the output (light emission) at eight rasters later than that of the light emitting elements located at the odd number-th positions indicates that the output (light emission) start positions of the light emitting elements located at the even number-th positions deviate from the output (light emission) start positions of the light emitting elements located at the odd number-th positions by the printing gap in the case of the resolution of 600 DPI (the gap in the sub-scanning direction shown in FIG. 4).

In addition, the light emitting elements located at the odd number-th positions end the output (light emission) after performing the output (light emission) corresponding to the video data of the M-th raster. On the contrary, the light emitting elements located at the even number-th positions perform the output (light emission) corresponding to the video data of eight rasters even after the light emitting elements located at the odd number-th positions end the output (light emission).

Here, the fact that the light emitting elements located at the even number-th positions end the output (light emission) at eight rasters later than that of the light emitting elements located at the odd number-th positions indicates that the output (light emission) end positions of the light emitting elements located at the even number-th positions deviate from the output (light emission) end positions of the light emitting elements located at the odd number-th positions by the printing gap in the case of the resolution of 600 DPI (the gap in the sub-scanning direction shown in FIG. 4).

Likewise, in the case where the line head 150 having the first arrangement pattern is used, when the output (light emission) is performed at the output (light emission) timing shown in FIG. 5, the video data of one raster such as "dot1-1", "dot1-2", "dot1-3", "dot1-4", and "dot1-5" is printed on a printing medium in a linear shape.

Figure 6:
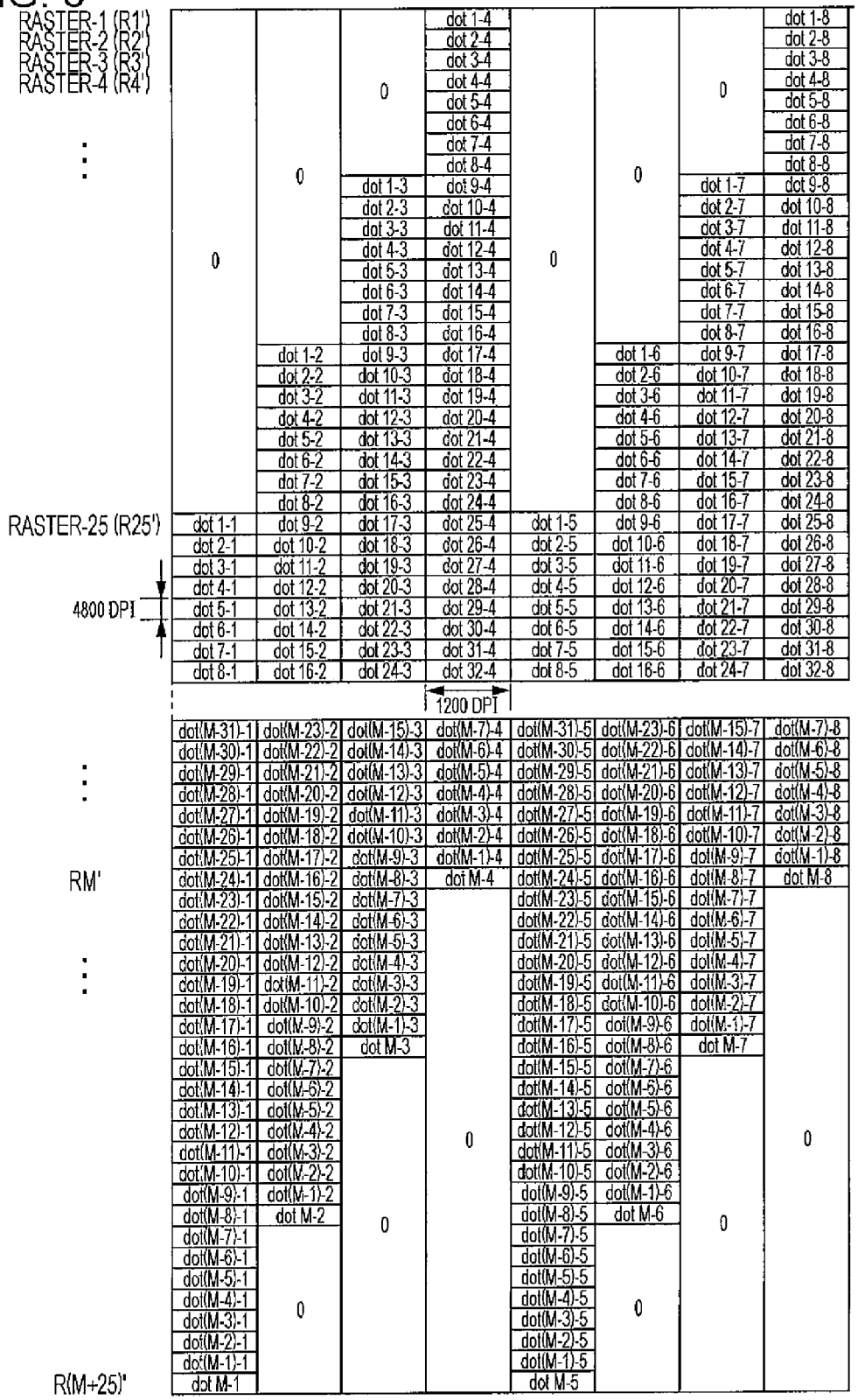
FIG. 6 is a diagram showing an example of an output of video data in the case where the line head having the second arrangement pattern is used.

Next, FIG. 6 is a diagram showing an example of the output (light emitting timing) of the video data in the case where the line head 150 having the second arrangement pattern is used.

As shown in FIG. 6, the light emitting elements located at the multiples of 4, 4 nth positions such as the fourth position and the eighth position first sequentially perform the output (light emission) corresponding to the video data of the rasters such as the first raster and the second raster. In addition, the light emitting elements located at the (4n-1)-th positions such as the third and seventh positions start the output (light emission) corresponding to the video data of the rasters such as the first raster and the second raster after the light emitting elements located at 4 nth positions perform the output (light emission) corresponding to the video data of eight rasters. In addition, the light emitting elements located at the (4n-2)-th positions such as the second and sixth positions start the output (light emission) corresponding to the video data of the rasters such as the first raster and the second raster after the light emitting elements located at the (4n-1)-th positions perform the output (light emission) corresponding to the video data of eighth rasters. In addition, the light emitting elements located at the (4n-3)-th positions such as the first and fifth positions start the output (light emission) corresponding to the video data of the rasters such as the first raster and the second raster after the light emitting elements located at the (4n-2)-th positions perform the output (light emission) corresponding to the video data of eight rasters.

That is, the output (light emission) start positions of the light emitting elements located at "the multiples of 4-1-th" positions deviate from the output (light emission) start positions of the light emitting elements located at the positions of "the multiples of 4-th" by the printing gap in the case of the resolution of 600 DPI (the gap in the sub-scanning direction shown in FIG. 4). In the same manner, the output (light emission) start positions of the light emitting elements located at "the multiples of 4-2-th" positions deviate from the output (light emission) start positions of the light emitting elements located at "the multiples of 4-1-th" positions by the printing gap in the case of the resolution of 600 DPI (the gap in the sub-scanning direction shown in FIG. 4). In the same manner, the output (light emission) start positions of the light emitting elements located at "the multiples of 4-3-th" positions deviate from the output (light emission) start positions of the light emitting elements located at "the multiples of 4-2-th" positions by the printing gap in the case of the resolution of 600 DPI (the gap in the sub-scanning direction shown in FIG. 4).

In addition, the light emitting elements located at "the multiples of 4-th" positions end the output (light emission) after performing the output (light emission) corresponding to the video data of the M-th raster. On the contrary, after the light emitting elements located at "the multiples of 4-th" positions end the output (light emission), the light emitting elements located at "the multiples of 4-1-th" positions perform the output (light emission) corresponding to the video data of eight rasters and end the output (light emission). In addition, after the light emitting elements located at "the multiples of 4-1-th" positions end the output (light emission), the light emitting elements located at "the multiples of 4-2-th" positions perform the output (light emission) corresponding to the video data of eight rasters and end the output (light emission). In addition, after the light emitting elements located at "the multiples of 4-2-th" positions end the output (light emission), the light emitting elements located at "the multiples of 4-3-th" positions perform the output (light emission) corresponding to the video data of eight rasters and end the output (light emission).

That is, the output (light emission) end positions of the light emitting elements located at "the multiples of 4-1-th" positions deviate from the output (light emission) end positions of the light emitting elements located at "the multiples of 4-th" positions by the printing gap in the case of the resolution of 600 DPI (the gap in the sub-scanning direction shown in FIG. 4). In the same manner, the output (light emission) end positions of the light emitting elements located at "the multiples of 4-2-th" positions deviate from the output (light emission) end positions of the light emitting elements located at "the multiples of 4-1-th" positions by the printing gap in the case of the resolution of 600 DPI (the gap in the sub-scanning direction shown in FIG. 4). In the same manner, the output (light emission) end positions of the light emitting elements located at "the multiples of 4-3-th" positions deviate from the output (light emission) end positions of the light emitting elements located at "the multiples of 4-2-th" positions by the printing gap in the case of the resolution of 600 DPI (the gap in the sub-scanning direction shown in FIG. 4).

Likewise, in the case where the line head 150 having the second arrangement pattern is used, when the output (light emission) is performed at the output (light emission) timing shown in FIG. 6, the video data of one raster such as "dot1-1", "dot1-2", "dot1-3", "dot1-4", and "dot1-5" is printed on the printing medium in a linear shape.

Figure 7:
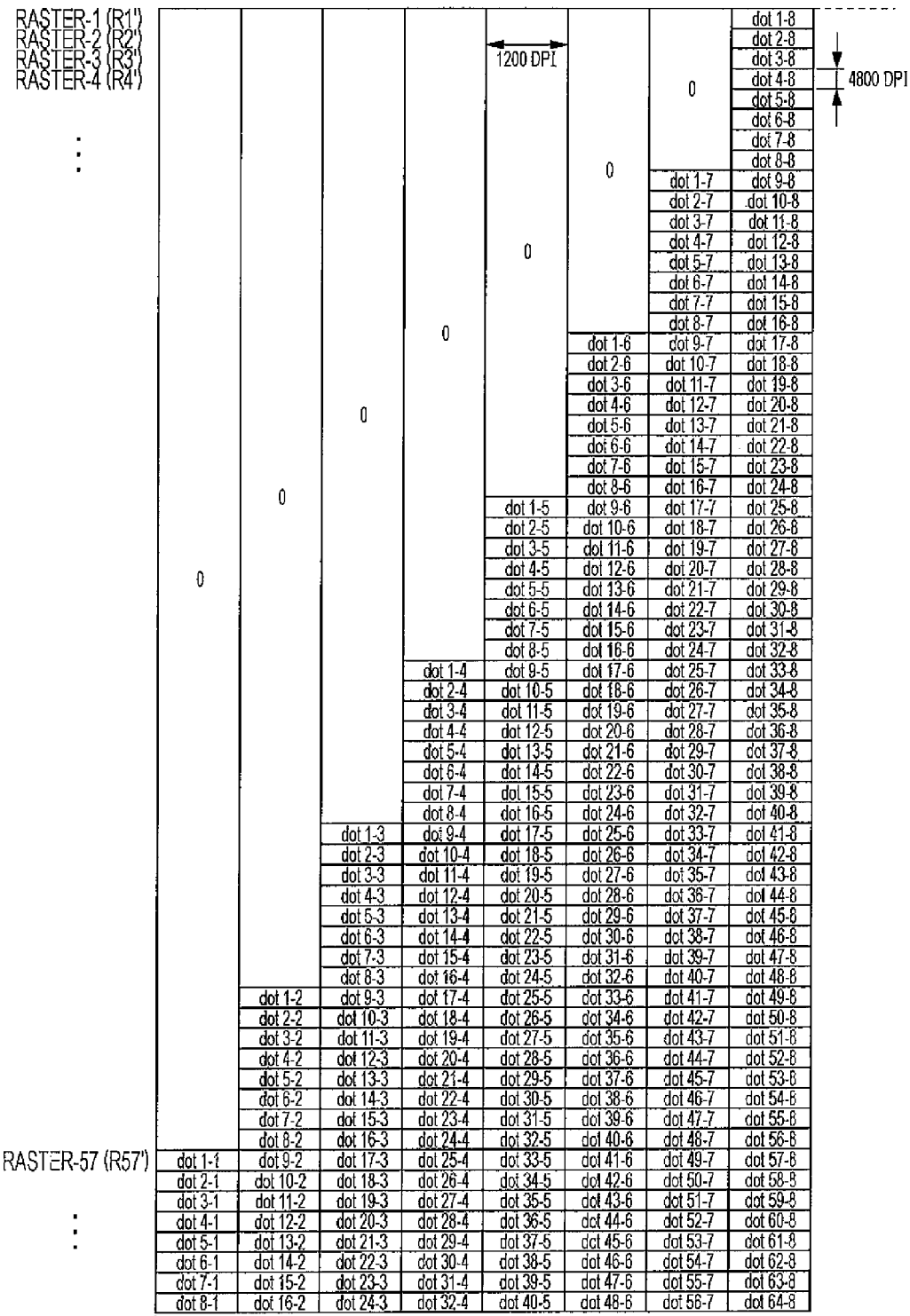
FIG. 7 is a diagram showing an example of an output of video data in the case where the line head having the third arrangement pattern is used.

Next, FIG. 7 is a diagram showing an example of the output (light emitting timing) of the video data in the case where the line head 150 having the third arrangement pattern is used.

As shown in FIG. 7, the light emitting elements located at "the multiples of 8-th" positions first sequentially perform the output (light emission) corresponding to the video data of the rasters such as the first raster and the second raster. In addition, the light emitting elements located at "the multiples of 8-1-th" positions start the output (light emission) corresponding to the video data of the rasters such as the first raster and the second raster after the light emitting elements located at "the multiples of 8-th" positions perform the output (light emission) corresponding to the video data of eight rasters. In the same manner, the light emitting elements located at positions of "multiples of 8-2-th", "multiples of 8-3-th", "multiples of 8-4-th", "multiples of 8-5-th", "multiples of 8-6-th", and "multiples of 8-7-th" start the output (light emission) corresponding to the video data of the rasters at the timing shown in FIG. 7.

That is, the output (light emission) start positions of the light emitting elements located at "the multiples of 8-1-th" positions deviate from the output (light emission) start positions of the light emitting elements located at "the multiples of 8-th" positions by the printing gap in the case of the resolution of 600 DPI (the gap in the sub-scanning direction shown in FIG. 4). In the same manner, the output (light emission) start positions of the light emitting elements located at "the multiples of 8-2-th" positions deviate from the output (light emission) start positions of the light emitting elements located at "the multiples of 8-1-th" positions by the printing gap in the case of the resolution of 600 DPI (the gap in the sub-scanning direction shown in FIG. 4). In addition, in the light emitting elements located at positions of "multiples of 8-3-th", "multiples of 8-4-th", "multiples of 8-5-th", "multiples of 8-6-th", and "multiples of 8-7-th", in the same manner, the output (light emission) start positions deviate from each other.

In addition, although it is not shown in the drawings, the light emitting elements located at "the multiples of 8-th" positions end the output (light emission) after performing the output (light emission) corresponding to the video data of the M-th raster. On the contrary, after the light emitting elements located at "the multiples of 8-th" positions end the output (light emission), the light emitting elements located at "the multiples of 8-1-th" positions perform the output (light emission) corresponding to the video data of eight rasters and end the output (light emission). In addition, after the light emitting elements located at "the multiples of 8-1-th" positions end the output (light emission), the light emitting elements located at "the multiples of 8-2-th" positions perform the output (light emission) corresponding to the video data of eight rasters and end the output (light emission). In addition, the light emitting elements located at the positions of "multiples of 8-3-th", "multiples of 8-4-th" positions, "multiples of 8-5-th", "multiples of 8-6-th", and "multiples of 8-7-th" end the output (light emission) in the same manner.

That is, the output (light emission) end positions of the light emitting elements located at "the multiples of 8-1-th" positions deviate from the output (light emission) end positions of the light emitting elements located at "the multiples of 8-th" positions by the printing gap in the case of the resolution of 600 DPI (the gap in the sub-scanning direction shown in FIG. 4). In the same manner, the output (light emission) end positions of the light emitting elements located at "the multiples of 8-2-th" positions deviate from the output (light emission) end positions of the light emitting elements located at "the multiples of 8-1-th" positions by the printing gap in the case of the resolution of 600 DPI (the gap in the sub-scanning direction shown in FIG. 4). In the same manner, in the light emitting elements located at the positions of "multiples of 8-3-th", "multiples of 8-4-th", "multiples of 8-5-th", "multiples of 8-6-th", and "multiples of 8-7-th", the output (light emission) end positions deviate from each other in the same manner.

Likewise, in the case where the line head 150 having the third arrangement pattern is used, when the output (light emission) is performed at the output (light emission) timing shown in FIG. 7, the video data of one raster such as "dot1-1", "dot1-2", "dot1-3", "dot1-4", and "dot1-5" is printed on the printing medium in a linear shape.

Figure 8:
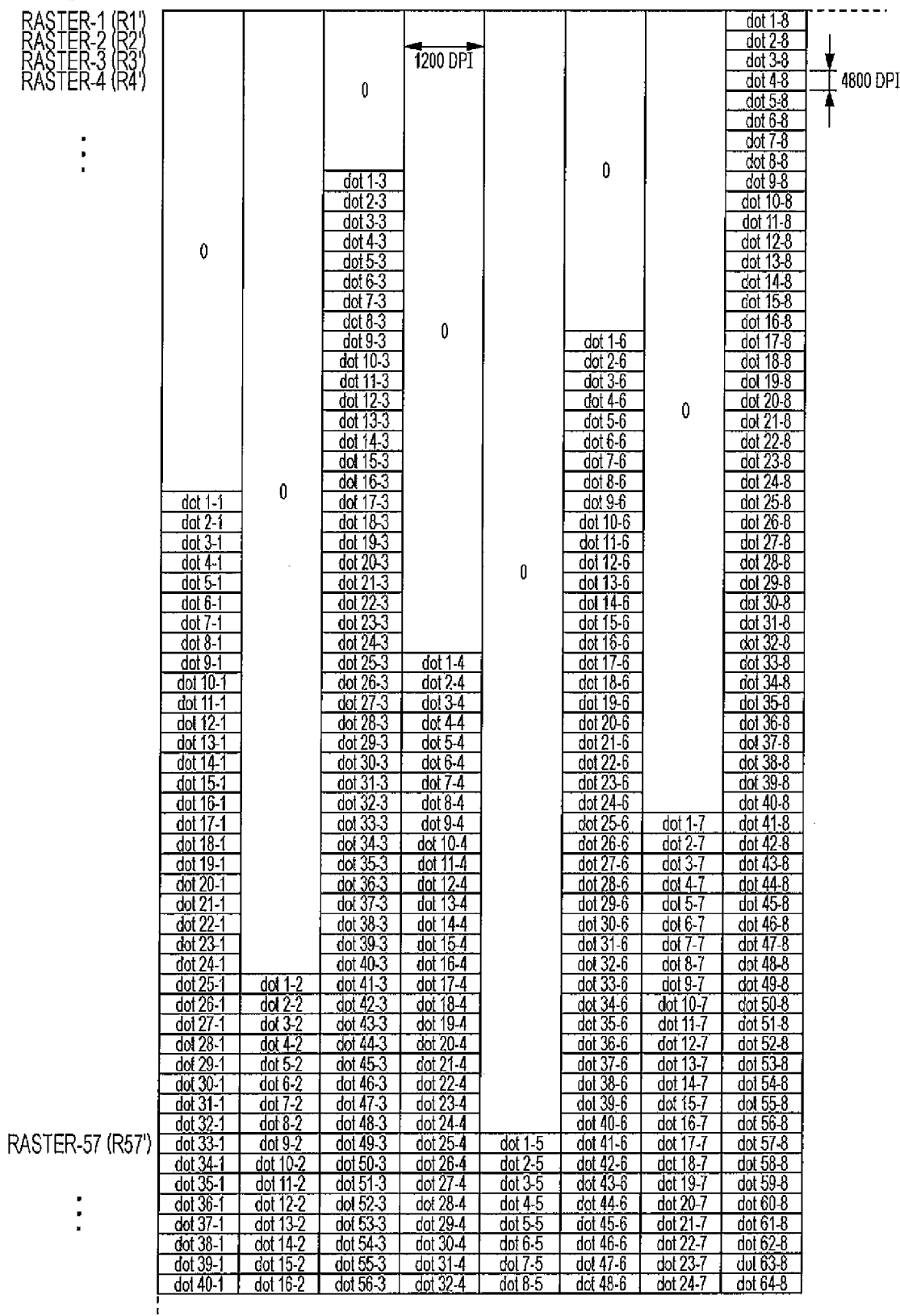
FIG. 8 is a diagram showing an example of an output of video data in the case where the line head having the fourth arrangement pattern is used.

Next, FIG. 8 is a diagram showing an example of the output (light emitting time) of the video data in the case where the line head 150 having the fourth arrangement pattern is used.

As shown in FIG. 8, the light emitting elements located at "the multiples of 8-th" positions first sequentially perform the output (light emission) corresponding to the video data of the rasters such as the first raster and the second raster. In addition, the light emitting elements located at "the multiples of 8-5-th" positions start the output (light emission) corresponding to the video data of the rasters such as the first raster and the second raster after the light emitting elements located at "the multiples of 8-th" positions perform the output (light emission) corresponding to the video data of eight rasters. In the same manner, the light emitting elements located at the positions of "multiples of 8-2-th", "multiples of 8-7-th", "multiples of 8-4-th", "multiples of 8-1-th", "multiples of 8-6-th", and "multiples of 8-3-th" start the output (light emission) corresponding to the video data of the rasters at the time shown in FIG. 8.

That is, the output (light emission) start positions of the light emitting elements located at "the multiples of 8-5-th" positions deviate from the output (light emission) start positions of the light emitting elements located at "the multiples of 8-th" positions by the printing gap in the case of the resolution of 600 DPI (the gap in the sub-scanning direction shown in FIG. 4). In the same manner, the output (light emission) start positions of the light emitting elements located at "the multiples of 8-2-th" positions deviate from the output (light emission) start positions of the light emitting elements located at "the multiples of 8-5-th" positions by the printing gap in the case of the resolution of 600 DPI (the gap in the sub-scanning direction shown in FIG. 4). In addition, in the light emitting elements located at the positions of "multiples of 8-7-th", "multiples of 8-4-th", "multiples of 8-1-th", "multiples of 8-6-th", and "multiples of 8-3-th", in the same manner, the output (light emission) start positions deviate from each other.

Further, although it is not shown in the drawings, the light emitting elements located at "the multiples of 8-th" positions end the output (light emission) after performing the output (light emission) corresponding to the video data of the M-th raster. On the contrary, after the light emitting elements located at "the multiples of 8-th" positions end the output (light emission), the light emitting elements located at "the multiples of 8-5-th" positions perform the output (light emission) corresponding to the video data of eight rasters and end the output (light emission). In addition, after the light emitting elements located at "the multiples of 8-5-th" positions end the output (light emission), the light emitting elements located at "the multiples of 8-2-th" positions perform the output (light emission) corresponding to the video data of eight rasters and end the output (light emission). In addition, the light emitting elements located at the positions of "multiples of 8-7-th", "multiples of 8-4-th", "multiples of 8-1-th", "multiples of 8-6-th", and "multiples of 8-3-th" end the output (light emission) in the same manner.

That is, the output (light emission) end positions of the light emitting elements located at "the multiples of 8-5-th" positions deviate from the output (light emission) end positions of the light emitting elements located at "the multiples of 8-th" positions by the printing gap in the case of the resolution of 600 DPI (the gap in the sub-scanning direction shown in FIG. 4). In the same manner, the output (light emission) end positions of the light emitting elements located at "the multiples of 8-2-th" positions deviate from the output (light emission) end positions of the light emitting elements located at "the multiples of 8-5-th" positions by the printing gap in the case of the resolution of 600 DPI (the gap in the sub-scanning direction shown in FIG. 4). In the same manner, in the light emitting elements located at the positions of "multiples of 8-7-th", "multiples of 8-4-th", "multiples of 8-1-th", "multiples of 8-6-th", and "multiples of 8-3-th", the output (light emission) end positions deviate from each other in the same manner.

Likewise, in the case where the line head 150 having the fourth arrangement pattern is used, when the output (light emission) is performed at the output (light emission) timing shown in FIG. 8, the video data of one raster such as "dot1-1", "dot1-2", "dot1-3", "dot1-4", and "dot1-5" is printed on the printing medium in a linear shape.

Next, FIG. 9 is a diagram showing an example of the output (light emitting timing) of the video data in the case where the line head 150 having the third arrangement pattern is used and the video data of one raster is printed at the printing gap in the case of the sub-scanning resolution of 2400 DPI.

As shown in FIG. 9, the light emitting elements located at "the multiples of 8-th" positions first sequentially perform the output (light emission) corresponding to the video data of the rasters such as the first raster and the second raster. In addition, the light emitting elements located at "the multiples of 8-1-th" positions start the output (light emission) corresponding to the video data of the rasters such as the first raster and the second raster after the light emitting elements located at "the multiples of 8-th" positions perform the output (light emission) corresponding to the video data of four rasters. In the same manner, the light emitting elements located at the positions of "multiples of 8-2-th, "multiples of 8-3-th", "multiples of 8-4-th", "multiples of 8-5-th", "multiples of 8-6-th", and "multiples of 8-7-th" start the output (light emission) corresponding to the video data of the rasters at the timing shown in FIG. 9.

That is, the output (light emission) start positions of the light emitting elements located at "the multiples of 8-1-th" positions deviate from the output (light emission) start positions of the light emitting elements located at "the multiples of 8-th" positions by the printing gap in the case of the resolution of 600 DPI (the gap in the sub-scanning direction shown in FIG. 4). In the same manner, the output (light emission) start positions of the light emitting elements located at "the multiples of 8-2-th" positions deviate from the output (light emission) start positions of the light emitting elements located at "the multiples of 8-1-th" positions by the printing gap in the case of the resolution of 600 DPI (the gap in the sub-scanning direction shown in FIG. 4). In addition, in the light emitting elements located at the positions of "multiples of 8-3-th", "multiples of 8-4-th", "multiples of 8-5-th", "multiples of 8-6-th", and "multiples of 8-7-th", in the same manner, the output (light emission) start positions deviate from each other.

Further, although it is not shown in the drawings, the light emitting elements located at "the multiples of 8-th" positions end the output (light emission) after performing the output (light emission) corresponding to the video data of the M-th raster. On the contrary, after the light emitting elements located at "the multiples of 8-th" positions end the output (light emission), the light emitting elements located at "the multiples of 8-1-th" positions perform the output (light emission) corresponding to the video data of four rasters and end the output (light emission). In addition, after the light emitting elements located at "the multiples of 8-1-th" positions end the output (light emission), the light emitting elements located at "the multiples of 8-2-th" positions perform the output (light emission) corresponding to the video data of four rasters and end the output (light emission). In addition, the light emitting elements located at the positions of "multiples of 8-3-th", "multiples of 8-4-th", "multiples of 8-5-th", "multiples of 8-6-th", and "multiples of 8-7-th" end the output (light emission) in the same manner.

That is, the output (light emission) end positions of the light emitting elements located at "the multiples of 8-1-th" positions deviate from the output (light emission) end positions of the light emitting elements located at "the multiples of 8-th" positions by the printing gap in the case of the resolution of 600 DPI (the gap in the sub-scanning direction shown in FIG. 4). In the same manner, the output (light emission) end positions of the light emitting elements located at "the multiples of 8-2-th" positions deviate from the output (light emission) end positions of the light emitting elements located at "the multiples of 8-1-th" positions by the printing gap in the case of the resolution of 600 DPI (the gap in the sub-scanning direction shown in FIG. 4). In the same manner, in the light emitting elements located at the positions of "multiples of 8-3-th", "multiples of 8-4-th", "multiples of 8-5-th", "multiples of 8-6-th", and "multiples of 8-7-th", the output (light emission) end positions deviate from each other in the same manner.

Likewise, even in the case where the printing gap of printing the video data of one raster is changed (the sub-scanning resolution: 2400 DPI), when the output (light emission) is performed at the output (light emission) time shown in FIG. 9, the video data of one raster such as "dot1-1", "dot1-2", "dot1-3", "dot1-4", and "dot1-5" is printed on the printing medium in a linear shape.

In addition, FIG. 10 is a diagram showing an example of the output (light emitting time) of the video data in the case where the line head 150 having the third arrangement pattern is used and the video data of one raster is printed at the printing gap in the case of the sub-scanning resolution of 1200 DPI.

As shown in FIG. 10, the light emitting elements located at "the multiples of 8-th" positions first sequentially perform the output (light emission) corresponding to the video data of the rasters such as the first raster and the second raster. In addition, the light emitting elements located at "the multiples of 8-1-th" positions start the output (light emission) corresponding to the video data of the rasters such as the first raster and the second raster after the light emitting elements located at "the multiples of 8-th" positions perform the output (light emission) corresponding to the video data of two rasters. In the same manner, the light emitting elements located at the positions of "multiples of 8-2-th", "multiples of 8-3-th", "multiples of 8-4-th", "multiples of 8-5-th", "multiples of 8-6-th", and "multiples of 8-7-th" start the output (light emission) corresponding to the video data of the rasters at the time shown in FIG. 10.

Further, although it is not shown in the drawings, the light emitting elements located at "the multiples of 8-th" positions end the output (light emission) after performing the output (light emission) corresponding to the video data of the M-th raster. On the contrary, after the light emitting elements located at "the multiples of 8-th" positions end the output (light emission), the light emitting elements located at "the multiples of 8-1-th" positions perform the output (light emission) corresponding to the video data of two rasters and end the output (light emission). In addition, after the light emitting elements located at "the multiples of 8-1-th" positions end the output (light emission), the light emitting elements located at "the multiples of 8-2-th" positions perform the output (light emission) corresponding to the video data of two rasters and end the output (light emission). In addition, the light emitting elements located at the positions of "multiples of 8-3-th", "multiples of 8-4-th, multiples of 8-5-th", "multiples of 8-6-th", and "multiples of 8-7-th" end the output (light emission) in the same manner.

Likewise, even in the case where the printing gap of printing the video data of one raster is changed (the sub-scanning resolution: 1200 DPI), when the output (light emission) is performed at the output (light emission) timing shown in FIG. 10, the video data of one raster such as "dot1-1", "dot1-2", "dot1-3", "dot1-4", and "dot1-5" is printed on the printing medium in a linear shape.

Figure 11:
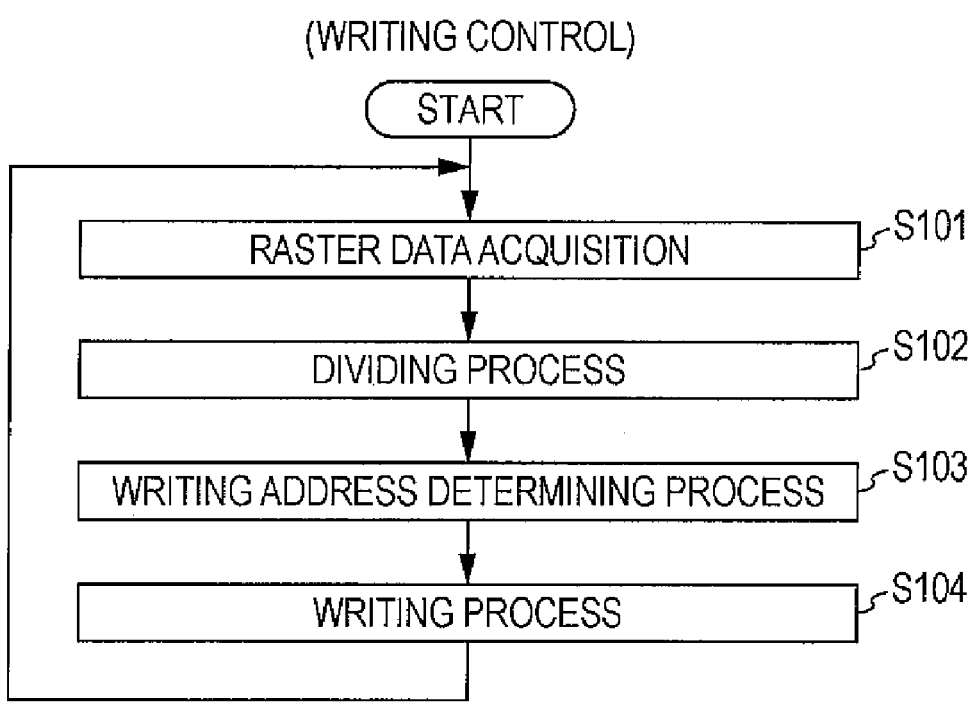
FIG. 11 is a flowchart showing a writing control process.

Next, the characteristic operation of the printer 100 having the above-described configuration will be described. FIG. 11 is a flowchart illustrating the writing control process performed by the printer 100.

The image processing circuit 140 of the printer 100 starts the writing control process upon turning on the printer 100.

After the writing control process starts, the video data dividing section 410 of the image processing circuit 140 acquires the video data (raster data) (Step S101). In detail, the memory control ASIC 120 supplies the video data stored in the memory 130 to the image processing circuit 140 by the unit of 32 bits, and the video data dividing section 410 receives the supplied video data.

Subsequently, the video data dividing section 410 divides the acquired video data (32 bits) (Step S102).

Figure 12:
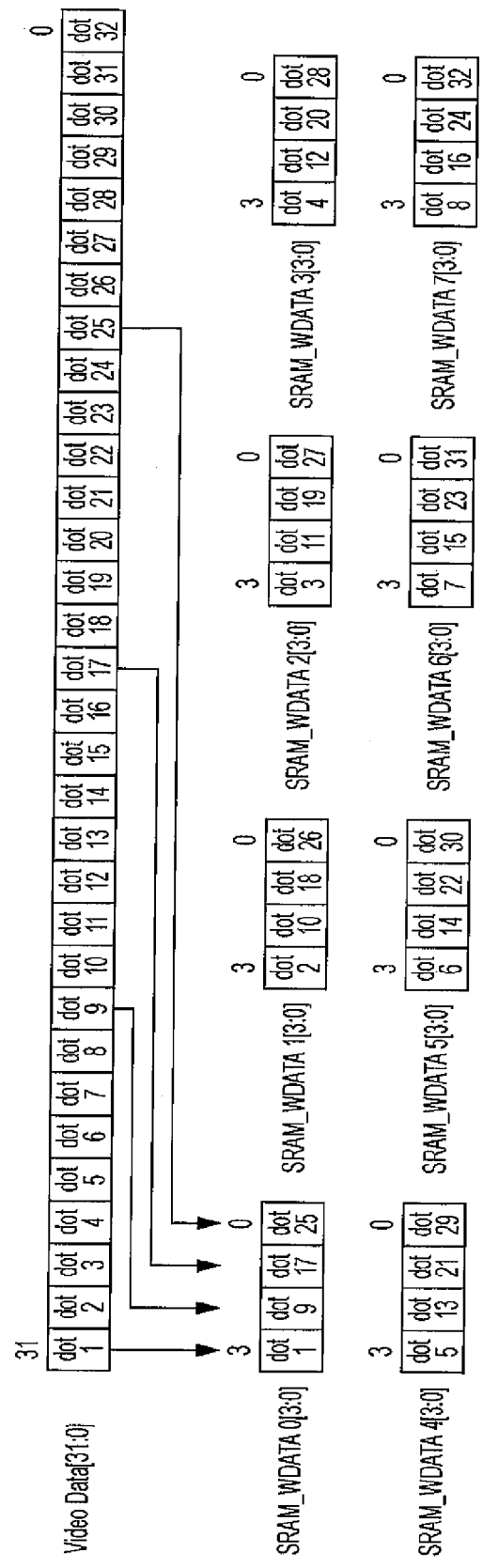
FIG. 12 is a diagram showing an outline of a dividing process performed by a video data dividing section.

FIG. 12 is a diagram showing an outline of the dividing process performed by the video data dividing section 410. As shown in FIG. 12, the video data dividing section 410 divides the video data of 32 bits into eight components so as to create video data of 4 bits. In detail, the video data of 4 bits is created by synthesizing the video data at the first, ninth, seventeenth and twenty fifth bits among the video data of 32 bits. In addition, in the case of the other video data, the video data of 4 bits is created in the same manner.

Returning to FIG. 11, the SRAM writing control section 450 determines the addresses on the SRAMs 0 to 7 respectively storing the video data of 4 bits divided in Step S102 (Step S103).

In detail, the SRAM writing control section 450 first reads the zigzag pattern information from the setting register 145, and specifies the arrangement pattern of the light emitting elements arranged in the line head 150. For example, the zigzag pattern information includes the data used to specify any one of the first to fourth arrangement patterns.

In addition, the SRAM writing control section 450 selects the light emitting pattern information corresponding to the specified arrangement pattern. Here, the light emitting pattern information is the data stored in the SRAM writing control section 450 in advance, and shows the light emitting timing (storage sequence).

Figure 13:
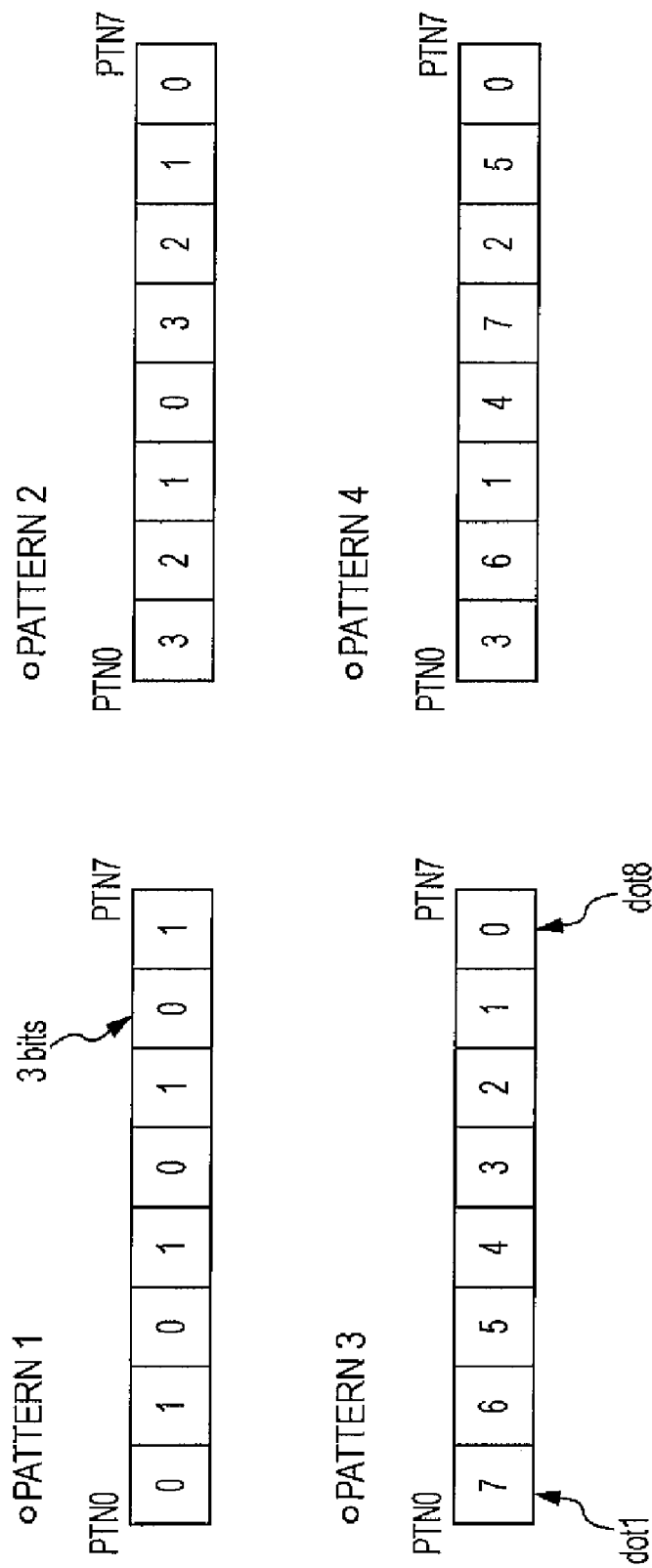
FIG. 13 is a diagram showing a schematic data structure of light emitting pattern information.

FIG. 13 is a diagram showing the structure of the data of the light emitting pattern information. "The pattern 1" is the light emitting pattern information corresponding to the first arrangement pattern, "the pattern 2" is the light emitting pattern information corresponding to the second arrangement pattern, "the pattern 3" is the light emitting pattern information corresponding to the third arrangement pattern, and "the pattern 4" is the light emitting pattern information corresponding to the fourth arrangement pattern.

As shown in FIG. 13, each light emitting pattern information includes eight timing information (PTNs 0 to 7). The timing information (PTNs 0 to 7) corresponds to the light emitting elements arranged in the line head 150. In detail, the timing information "PTN 0" corresponds to the light emitting elements located at "the multiples of 8-7-th" positions among the light emitting elements arranged in the line head 150 in the main scanning direction, and the timing information "PTN 1" corresponds to the light emitting elements located at "the multiples of 8-6-th" positions among the light emitting elements arranged in the main scanning direction. In the same manner, the timing information "PTN 2" corresponds to the light emitting elements located at "the multiples of 8-5-th" positions, the timing information "PTN 3" corresponds to the light emitting elements located at "the multiples of 8-4-th" positions, the timing information "PTN 4" corresponds to the light emitting elements located at "the multiples of 8-3-th" positions, the timing information "PTN 5" corresponds to the light emitting elements located at "the multiples of 8-2-th" positions, the timing information "PTN 6" corresponds to the light emitting elements located at "the multiples of 8-1-th" positions, and the timing information "PTN 7" corresponds to the light emitting elements located at "the multiples of 8-th" positions.

In addition, each of the timing information (PTNs 0 to 7) is capable of storing the information of 3 bits (0 to 7) at maximum, and shows the light emitting timing (light emitting sequence) in the sub-scanning direction. In detail, light is emitted in a sequence of "0", "1", and "2" to "7". In the example of "the pattern 1", the light emitting elements located at the positions of "multiples of 8-7-th", "multiples of 8-5-th" "multiples of 8-3-th", and "multiples of 8-1-th" emit light first, and the light emitting elements located at the positions of "multiples of 8-6-th", "multiples of 8-4-th", "multiples of 8-2-th", and "multiples of 8-th" emit light at the late timing by the printing gap in the case of the resolution of 600 DPI (the gap in the sub-scanning direction shown in FIG. 4).

In the same manner, in the example of "the pattern 2", the light emitting elements located at the positions of "multiples of 8-4-th" and "multiples of 8-th" emit light first, and the light emitting elements located at the positions of "multiples of 8-5-th" and "multiples of 8-1-th" emit light at the late timing by the printing gap in the case of the resolution of 600 DPI (the gap in the sub-scanning direction shown in FIG. 4). In addition, the light emitting elements located at the positions of "multiples of 8-6-th" and "multiples of 8-2-th" emit light at the late timing by the printing gap in the case of the resolution of 600 DPI (the gap in the sub-scanning direction shown in FIG. 4). In addition, the light emitting elements located at the positions of "multiples of 8-7-th" and "multiples of 8-3-th" emit light at the late timing by the printing gap in the case of the resolution of 600 DPI (the gap in the sub-scanning direction shown in FIG. 4).

In the examples "the pattern 3" and "the pattern 4", the light emitting timing (light emitting sequence) is shown in the same manner.

In addition, when one light emitting pattern information is selected, the SRAM writing control section 450 calculates an address (writing address), used to write the divided video data, for each of the SRAMs 0 to 7.

Figure 14:
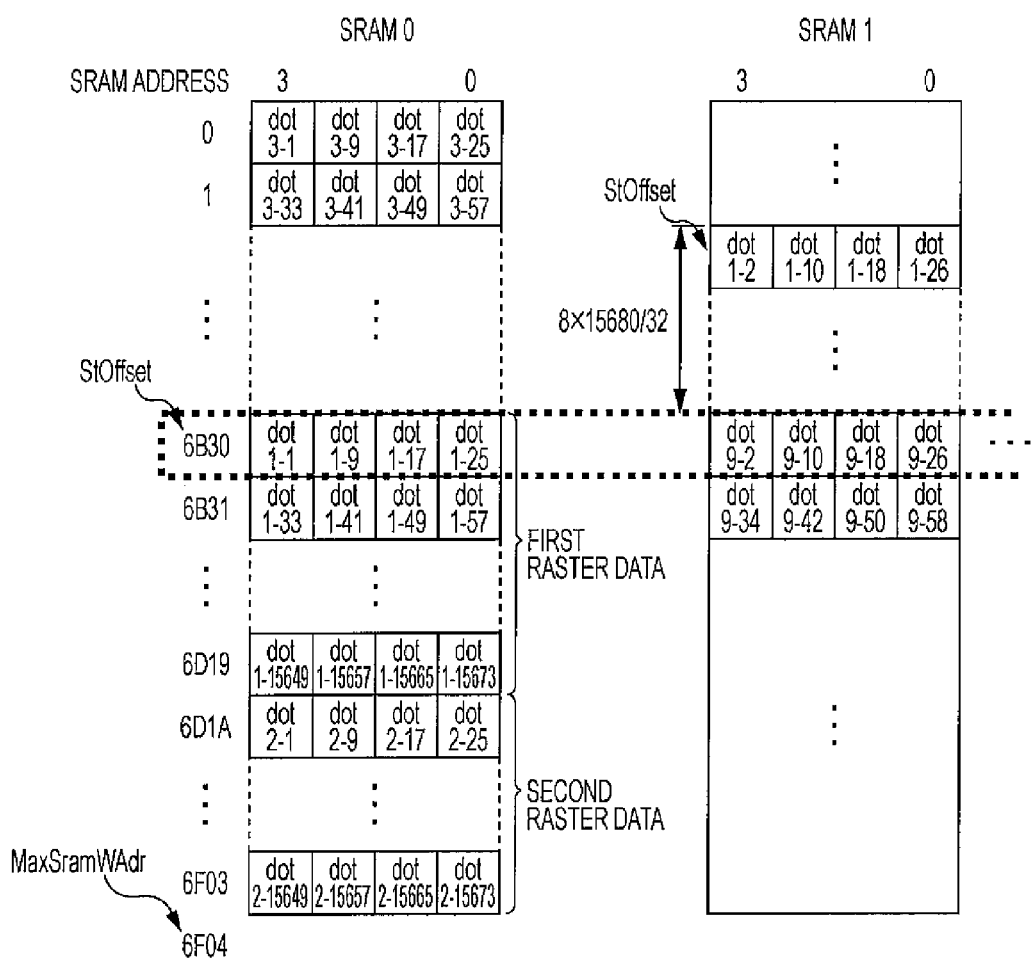
FIG. 14 is a diagram conceptually showing an address on an SRAM.

Hereinafter, the writing address calculating method will be described with reference to FIG. 14. FIG. 14 is a diagram conceptually showing the addresses on the SRAMs 0 and 1.

The SRAM writing control section 450 first acquires a writing start address (StOffset) determined on the basis of the light emitting pattern information (timing information). Here, the writing start address (StOffset) of each of the SRAMs 0 to 7 is determined by the value of each of the timing information (PTNs 0 to 7). For example, the SRAM writing control section 450 acquires the writing start address (StOffset) on the basis of Equation 1.

$$StOffset = PtnNum \times VertRes \times MaxDot/BitWidth \qquad \text{(Equation 1)}$$

In addition, the PtnNum indicates the values ("0" to "7") of the timing information (PTNs 0 to 7) shown in FIG. 13. In addition, the VertRes indicates the resolution ratio in the sub-scanning direction (the sub-scanning resolution/the resolution of the adjacent light emitting elements in the sub-scanning direction). For example, the SRAM writing control section 450 reads the sub-scanning information stored in advance in the setting register 145 so as to specify the resolution. Then, in the case where the specified resolution is 600 DPI, the value of the VertRes is set to "1". In the case where the specified resolution is 1200 DPI, the value of the VertRes is set to "2". In the case where the specified resolution is 2400 DPI, the value of the VertRes is set to "4". In the case where the specified resolution is 4800 DPI, the value of the VertRes is set to "8". In addition, the MaxDot indicates the maximum number of dots (the number of dots corresponding to one raster) in the main scanning direction, and the BitWidth indicates the input bit width of the video data dividing section 410. Here, the MaxDot/BitWidth indicates the number of addresses (the number of rows) required to store the video data of one raster in the SRAMs 0 to 7.

As described above, when the writing start address (StOffset) is acquired on the basis of the light emitting pattern (timing information), it is possible to appropriately perform the zigzag correction regardless of the arrangement patterns of the light emitting elements.

In addition, the writing start address (StOffset) is changed in proportional to the resolution in the sub-scanning direction. For this reason, it is possible to appropriately perform the zigzag correction (in accordance with the deviation of the light emitting elements in the sub-scanning direction) regardless of the values of the resolution in the sub-scanning direction.

Further, Equation 1 is an equation used in the case where the mirror image ON/OFF information is set to "OFF". In the case where the mirror image ON/OFF information set to "ON" is stored in the setting register 145, the SRAM writing control section 450 changes the sequence of the light emitting pattern information (timing information), and demands the writing start address (StOffset). Here, the operation of changing the sequence of the light emitting pattern information (timing information) indicates that the PTNs 0 to 7 are changed to the PTNs 7 to 0. In this case, the writing control section 450 acquires the writing start address (StOffset) on the basis of Equation 2.

$$St\text{Offset} = (\text{Max}Ptn\text{Num} - Ptn\text{Num}) \times \text{VertRes} \times \text{MaxDot}/\text{BitWidth} \quad \text{(Equation 2)}$$

However, the MaxPtnNum indicates the maximum value of the timing information (PTNs 0 to 7).

Next, the SRAM writing control section 450 counts the number of dots of the video data written in advance to the SRAMs 0 to 7, and calculates the address (writing address) used to write the video data in addition to the writing start address (StOffset). In addition, when the video data is written to the maximum value "6F03" of the SRAM address of the SRAMs 0 to 7, the writing address is calculated so that the video data is written from the minimum value "0" of the SRAM address of the SRAMs 0 to 7.

In detail, the SRAM writing control section 450 calculates the writing address on the basis of Equation 3.

$$Sram\text{WAdr} = \{St\text{Offset} + (Wras\text{Cnt} \times \text{MaxDot} + W\text{Dot-Cnt})/\text{BitWidth}\} \bmod \text{Max}Sram\text{WAdr} \quad \text{(Equation 3)}$$

Here, the SramWadr indicates the writing address. In addition, the StOffset indicates the writing start address of the SRAMs 0 to 7, the WrasCnt indicates the count value of the rasters (in the sub-scanning direction), the MaxDot indicates the maximum number of dots (the number of dots corresponding to one raster) in the main scanning direction, and the WDotCnt indicates the dot count value in the main scanning direction. Further, the BitWidth indicates the input bit width of the video data dividing section 410, and the MaxSramWAdr indicates the maximum value of the SRAM address.

As described above, the SRAM writing control section 450 acquires the start address (StOffset) used to write the video data to each of the SRAMs 0 to 7 in accordance with the deviation in the arrangement of the light emitting elements (the deviation in the sub-scanning direction). In addition, the video data writing address is determined on the basis of the writing start address (StOffset). When the video data is stored in the writing address positions (SRAMs 0 to 7) determined in this manner, it is possible to read the video data (for example, the video data surrounded by the frame depicted by the dotted line) of each of the SRAMs 0 to 7 by designating the same address. Accordingly, it is possible to perform the output (the zigzag correction) of the video data in accordance with the light emitting timing shown in FIGS. 5 to 10.

Returning to FIG. 11, the SRAM writing control section 450 performs the writing process of writing the video data to the writing address positions (SRAMs 0 to 7) determined in Step S103 (Step S104). In addition, the image processing circuit 140 repeats the processes in Step S101 to Step S104 whenever acquiring the video data (raster data), and stores the video data in the SRAMs 0 to 7.

Figure 15:
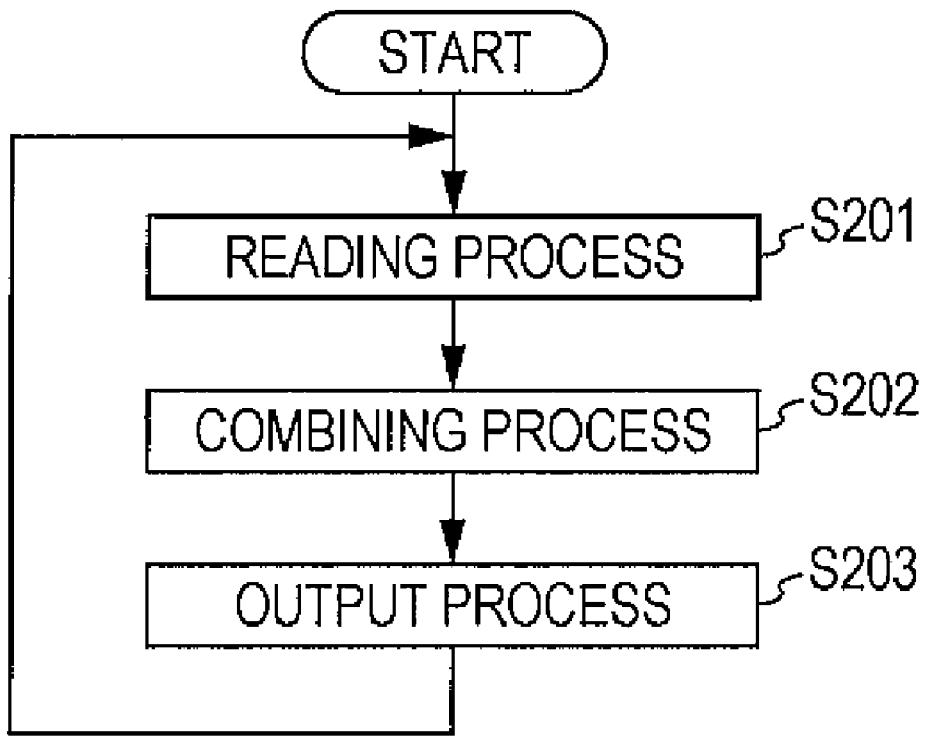
FIG. 15 is a flowchart showing a reading control process.

Next, FIG. 15 is a flowchart illustrating the reading control process performed by the printer 100.

The SRAM reading control section 440 of the printer 100 starts the reading control process when the video data is input to the SRAMs 0 to 7.

After the reading control process starts, the SRAM reading control section 440 performs a reading process of reading the video data stored in the SRAMs 0 to 7 (Step S201). In detail, the SRAM reading control section 440 reads parallel the video data (the video data of 4 dots×8 in the example shown in FIG. 14) stored in the same address in the SRAMs 0 to 7, and supplies the video data to the zigzag correction data combining section 430.

Subsequently, the zigzag correction data combining section 430 combines the video data (32 bits) supplied from the SRAMs 0 to 7 (Step S202).

Figure 16:
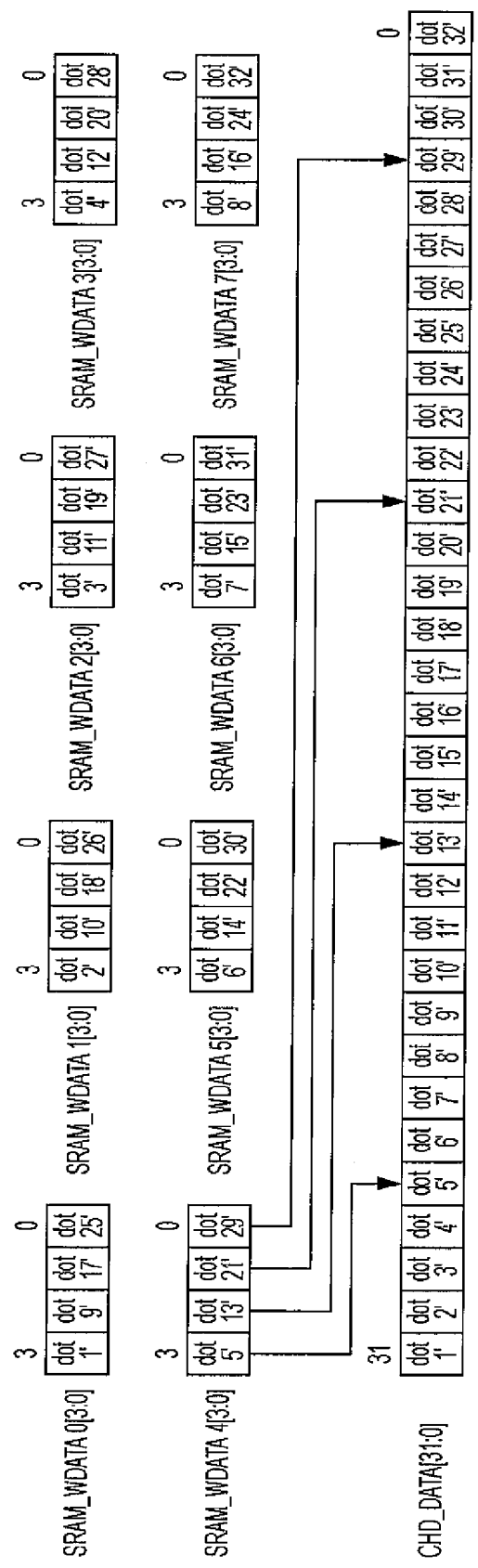
FIG. 16 is a diagram showing an outline of a combining process performed by a zigzag correction data combining section.

FIG. 16 is a diagram showing an outline of the combining process performed by the zigzag correction data combining section 430. As shown in FIG. 16, the zigzag correction data combining section 430 combines the video data supplied from each of the SRAMs 0 to 7 by the unit of 4 bits, and creates the video data of 32 bits. For example, the video data of 4 bits read from the SRAM 4 is combined with the data at the fifth, thirteenth, twenty-first, and twenty-ninth bits among the created data of 32 bits as depicted by the arrow. Also, the other bits are combined as shown in FIG. 16. In addition, in the combing process described herein, the invention is not limited to the combining process shown in FIG. 16. That is, the combining process may be opposite to the dividing process shown in FIG. 12.

Subsequently, the zigzag correction data combining section 430 outputs the combined video data to the line head 150 (Step S203). In detail, the zigzag correction data combining section 430 outputs the video data of 32 bits combined in Step S202 to the line head 150 through the line head I/F 460.

In addition, the image processing circuit 140 repeats the processes in Step S201 to Step S203 until all the video data (raster data) stored in the SRAMs 0 to 7 is output to the line head 150.

Further, the line head 150 emits light from the light emitting elements on the basis of the video data sequentially output from the image processing circuit 140 by the above-described reading process.

When the writing control process and the reading control process are performed by the printer 100, it is possible to perform the zigzag correction on the line heads 150 having the various arrangement patterns and to handle plural sub-scanning resolutions. In addition, since the stored video data divided into plural SRAMs 0 to 7 is read in parallel by designating the same address, it is possible to rapidly read the video data.

In addition, the invention is not limited to the above-described embodiment. That is, the invention may be modified into various forms and may be used in various applications.

For example, in the above-described embodiment, the number of the SRAMs 0 to 7 (storage region) constituting the SRAM 420 is eight. However, the invention is not limited to the configuration of the SRAM 420. In addition, the input-output bit width of the data of each of the SRAMs 0 to 7 is not limited to 4 bits. However, as in the example shown in FIG. 2, when such a condition that "the number of SRAMs 0 to 7"×"the input-output bit width of each of the SRAMs 0 to 7"="the input-output bit width of the video data dividing section 410" is designed to be satisfied, the address on each of the SRAMs 0 to 7 is simply calculated. Accordingly, it is possible to rapidly read and write the data of the SRAM 420 (SRAMs 0 to 7).

The entire disclosure of Japanese Patent Application No. 2008-294152, filed Nov. 18, 2008 and No. 2009-164544, filed Jul. 13, 2009 are expressly incorporated by reference herein.

What is claimed is:

1. An image processing controller for controlling a line head having a plurality of light emitting elements arranged in a non-linear shape, the image processing controller comprising:

a plurality of memory regions which stores raster data;
an acquiring section which acquires the raster data;
a writing control section which sequentially distributes the acquired raster data to the plurality of memory regions so as to be stored therein; and a reading control section which reads each raster data from the plurality of memory regions and sends the read raster data to the line head so as to control a light emitting state of the light emitting elements, wherein the writing control section determines an address on the memory region storing each raster data in accordance with a resolution in the sub-scanning direction and an arrangement pattern of the light emitting elements arranged in the line head, the writing control section determines the address so that the deviation in the address becomes large as the set resolution in the sub-scanning direction becomes high, and the writing control section calculates the address on the basis of an equation of SramWAdr ={StOffset +(WrasCnt×MaxDot+WDotCnt)/BitWidth} mod MaxSramWAdr, where the SramWAdr indicates the address, the StOffset indicates a writing start address in the memory region, the WrasCnt indicates a raster (sub-scanning) count value, the MaxDot indicates the maximum number of dots (the number of dots corresponding to one raster) in the main scanning direction, the WDotCnt indicates a dot count value in the main scanning direction, the BitWidth indicates a bit width of the raster data acquired at once by the acquiring section, and the MaxSramWAdr indicates a maximum value of the address.

2. The image processing controller according to claim 1, wherein the writing control section determines the address so that the deviation in the address becomes large as the set resolution in the sub-scanning direction becomes high.

3. The image processing controller according to claim 1, wherein the writing start address (StOffset) is calculated on the basis of an equation of StOffset=PtnNum×VertRes×MaxDot/BitWidth, where the PtnNum indicates a deviation in the arrangement in the sub-scanning direction of the light emitting elements, and the VertRes indicates a value proportional to the resolution in the sub-scanning direction.

4. The image processing controller according to claim 1, wherein the reading control section reads parallel the raster data from the plurality of memory regions by the unit of a predetermined number of bits.

5. The image processing controller according to claim 4, wherein the writing control section divides the acquired raster data into data of a predetermined number of bits, and sequentially distributes the data of the predetermined number of bits to the plurality of memory regions so as to be stored therein, and wherein the reading control section reads the raster data from the plurality of memory regions by designating the same address of the memory regions.

6. A printing apparatus for controlling a line head having a plurality of light emitting elements arranged in a non-linear shape, the printing apparatus comprising:

a plurality of memory regions which stores raster data;

an acquiring section which acquires the raster data;

a writing control section which sequentially distributes the acquired raster data to the plurality of memory regions so as to be stored therein; and a reading control section which reads each raster/data from the plurality of memory regions and sends the read raster data to the line head so as to control a light emitting state of the light emitting elements, wherein the writing control section determines an address on the memory region storing each raster data in accordance with a resolution in the sub-scanning direction and an arrangement pattern of the light emitting elements arranged in the line head, the writing control section determines the address so that the deviation in the address becomes large as the set resolution in the sub-scanning direction becomes high, and the writing control section calculates the address on the basis of an equation of SramWAdr ={StOffset+(WrasCnt×MaxDot+WDotCnt)/BitWidth } mod MaxSramWAdr, where the SramWAdr indicates the address, the StOffset indicates a writing start address in the memory region, the WrasCnt indicates a raster (sub-scanning) count value, the MaxDot indicates the maximum number of dots (the number of dots corresponding to one raster) in the main scanning direction, the WDotCnt indicates a dot count value in the main scanning direction, the BitWidth indicates a bit width of the raster data acquired at once by the acquiring section, and the MaxSramWAdr indicates a maximum value of the address.

* * * * *